(12) United States Patent
Sites et al.

(10) Patent No.: US 6,201,600 B1
(45) Date of Patent: Mar. 13, 2001

(54) METHOD AND APPARATUS FOR THE AUTOMATIC INSPECTION OF OPTICALLY TRANSMISSIVE OBJECTS HAVING A LENS PORTION

(75) Inventors: Peter Winston Sites, Knoxville; Anthony Scott Nelms, Maryville; Bernard A. Roche, Farragut, all of TN (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 08/995,081

(22) Filed: Dec. 19, 1997

(51) Int. Cl.[7] ............... G01B 9/00; G01N 21/00
(52) U.S. Cl. ............ 356/124; 356/239.1; 356/237.2
(58) Field of Search ................. 356/124, 237, 356/239, 125, 126, 127, 240, 239.1, 237.2; 382/141, 143

(56) References Cited

U.S. PATENT DOCUMENTS

| | | | | |
|---|---|---|---|---|
| 5,500,732 | * | 3/1996 | Ebel et al. | 356/124 |
| 5,515,159 | * | 5/1996 | Sites et al. | 356/237 |
| 5,640,464 | * | 6/1997 | Ebel et al. | 382/143 |
| 5,828,446 | * | 10/1998 | Davis | 356/124 |
| 5,847,822 | * | 12/1998 | Sugiura et al. | 356/239 |

* cited by examiner

*Primary Examiner*—Frank G. Font
*Assistant Examiner*—Roy M. Punnoose

(57) ABSTRACT

A system for inspecting intraocular lenses which utilizes a light source and an electronic camera for obtaining images of the lens under test. A series of masks is utilized during the obtaining of the images and includes a bright field mask which allows the transmission of light through the lens, a dark field mask which blocks a portion of the light which would normally pass through the lens and a transition mask which is constituted by fine stripes. A signal processor analyzes the images obtained utilizing the masks and provides an indication of predetermined defects in the lens.

27 Claims, 28 Drawing Sheets

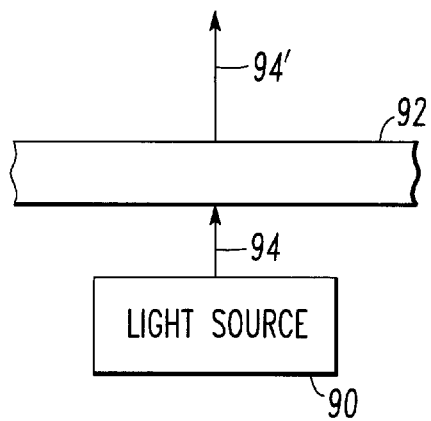 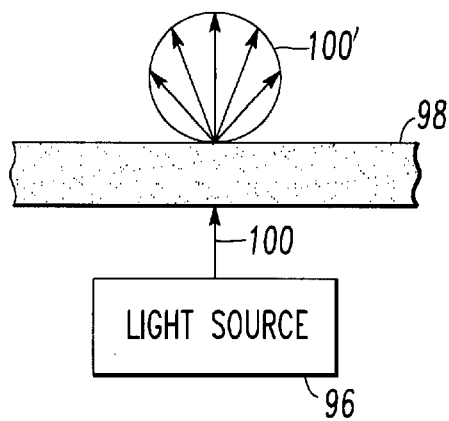
*FIG.5A*  *FIG.5B*
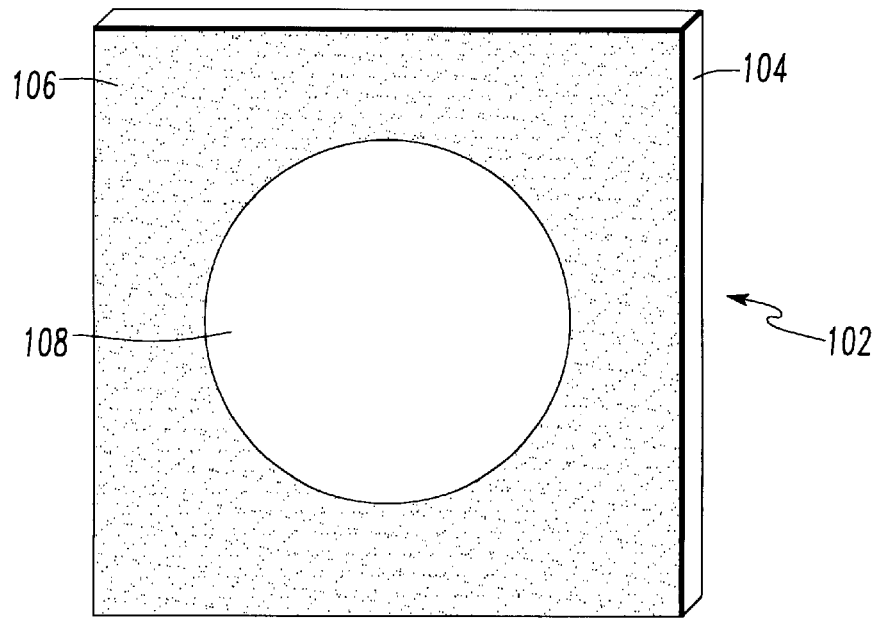
*FIG.6A*

"UNCURED" TYPE DEFECT

"TEAR" TYPE DEFECT

"TEAR" TYPE DEFECT

"DIG" TYPE DEFECT

"PIT" TYPE DEFECT

"FLOW MARK" TYPE DEFECT

METHOD AND APPARATUS FOR THE AUTOMATIC INSPECTION OF OPTICALLY TRANSMISSIVE OBJECTS HAVING A LENS PORTION

BACKGROUND OF THE INVENTION

1. Field of the Invention

The invention in general relates to inspection systems and more particularly to a system which automatically inspects objects such as lenses to determine various defects.

2. Description of Related Art

In the field of optics manufacture a need exists for determining the presence, as well as severity, of defects in optical components such as lenses for eyeglasses, contact lenses and intraocular lenses (IOL), by way of example.

Widely used current inspection techniques include the individual examination of each component by a human operator using a microscope or other magnifying device for defect and quality control. Although defects may be determined using this process, it is tedious and subject to human error. In addition, various defects may not be discernible to the human eye.

To improve the examination process, some manufacturers utilize machine vision technology whereby the examination procedure is done automatically using digital video cameras for image capture and image processing for defect determination. This process is a significant improvement over the human operator method but is still not capable of properly or sufficiently enhancing the entire range of defect types and products.

The present invention not only can identify a greater range of defects in an optical component than previous techniques but is able to accommodate a greater variety of different product types.

SUMMARY OF THE INVENTION

Apparatus is provided for determining defects in an optically transmissive object having a lens portion, an intraocular lens being an example. At least one camera is provided, along with a light source for directing light at the camera. An object inspection location is disposed between the light source and camera for receiving an object to be tested. At least two, and preferably three masks are used during the inspection of the object. One of the masks is a bright field mask which allows light to be transmitted through the object, another of the masks is a dark field mask which blocks light which would normally pass through the object and the third is a transition mask which is constituted by a fine pattern of alternating light transmitting and light blocking regions. Images of the object under test are obtained with the masks alternatively in place and a signal processor process the images to obtain indications of predetermined defects.

BRIEF DESCRIPTION OF THE DRAWINGS

FIGS. 5A and 5B serve to illustrate the production of diffused light.

FIGS. 6A and 6B are types of bright field masks that may be used herein.

DESCRIPTION OF THE PREFERRED EMBODIMENT

Figure 1:
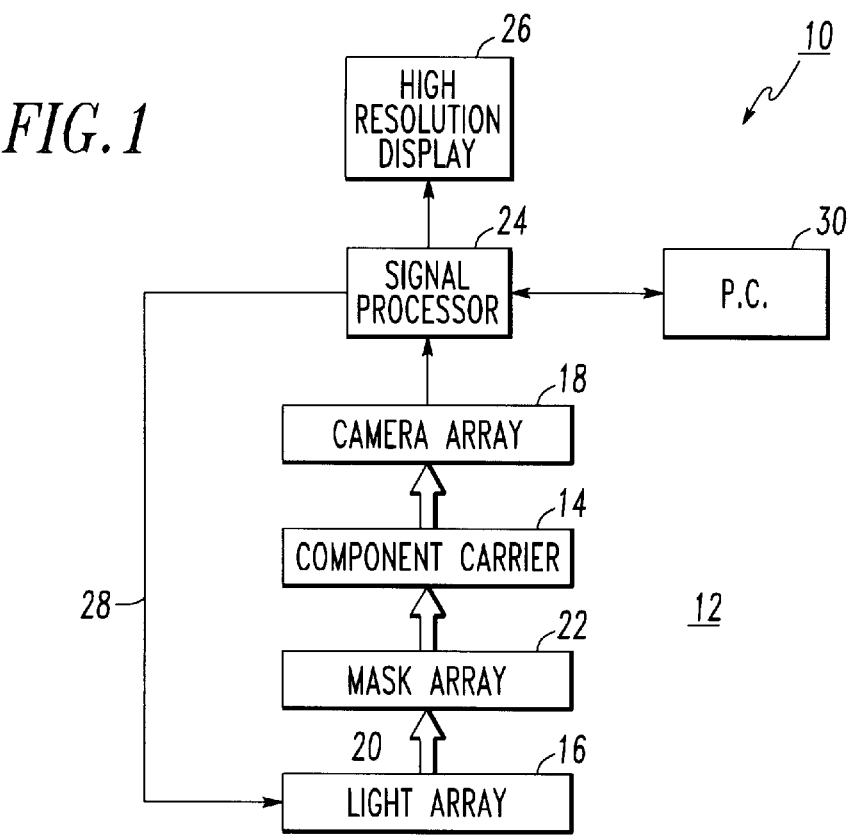
FIG. 1 is a block diagram broadly illustrating the principle of operation of the present invention.

In the drawings, which are not necessarily to scale, like or corresponding parts are denoted by like or corresponding reference numerals.

FIG. 1 illustrates an automatic inspection system 10 for examining and determining defects in an optically transmissive component having a lens portion. The optical component is brought to an inspection position 12 by means of a component carrier 14 located between a light array 16 and a camera array 18. As utilized herein the term "array" can mean one or more items.

Light from the light array 16, as indicated by arrow 20, passes through a mask array 22 prior to illuminating the component under test. The mask array 22, as will be described, is comprised of at least two masks and the arrangement projects light through the component, the image of which is captured by the camera array.

Signal processor 24 is operable to take captured images and perform various diagnostic routines to determine the presence of a multitude of possible defects using images obtained with the different masks. These images may, if desired, be displayed on a high resolution display 26. Under a preferred mode of operation, the light array 16 is a strobe arrangement and the signal processor 24 is operable to initiate a strobing action by means of a signal on line 28.

A personal computer 30 may be included and allows for operator interaction with the signal processor 24 to enter data such as component lot number, lens power, and to obtain information on defects, product runs, and summaries, by way of example.

Although the invention is applicable to various types of optically transmissive components, it will be described by way of example with respect to those having a lens portion, and more particularly to IOLs.

Figure 2:
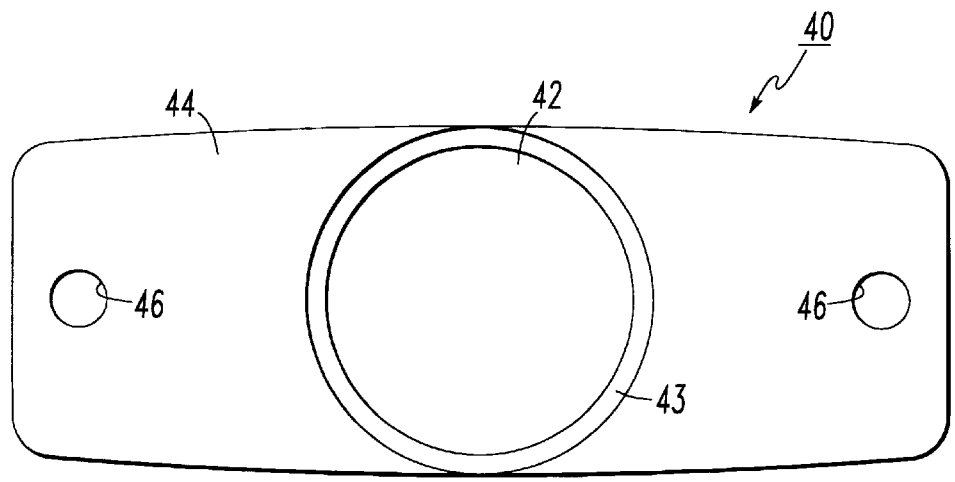
FIG. 2 is a plan view of one type of IOL.

An IOL is a surgical implant used to replace the lens within an eye, where the lens has been removed, for example, as a result of cataract surgery, disease, or physical damage. FIG. 2 illustrates, in plan view, one type of IOL 40.

IOL 40 is a one-piece IOL which includes a bi-convex lens defining an optic zone 42, surrounded by an annular zone 43, and a flat flange, or non-optic portion, defining a haptic zone 44. Anchor holes 46 secure the IOL 40 to the interior of the eye.

Figure 3:
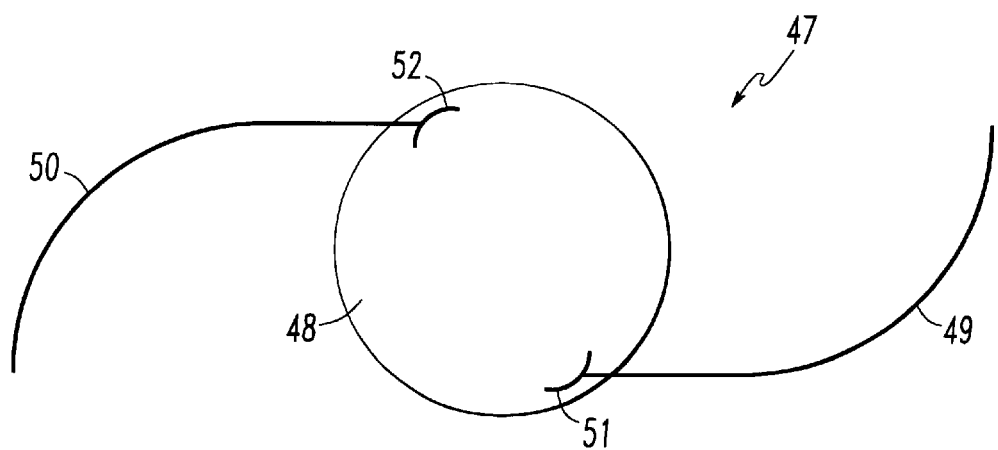
FIG. 3 is a plan view of another type of IOL.
Figure 3A:
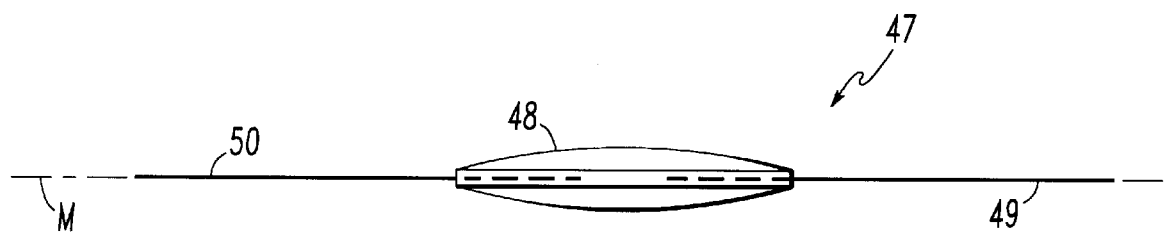
FIG. 3A is a side view of the IOL of FIG. 3.

FIG. 3 illustrates a three-piece type of IOL 47 which has an optic zone 48 and which includes loops 49 and 50 for surgical connection to the eye. Each loop 49 and 50 is secured to the optic zone 48 by means of respective loop anchors 51 and 52. The side view of IOL 47 in FIG. 3A illustrates the bi-convex nature of the lens, which is symmetrical about a mid plane M.

During the manufacturing process the IOLs may be subject to a variety of defects. The following list defines various typical defects, although the terminology may vary from one manufacturer to another.

Scratches: scratches appear as long, narrow surface abrasions usually specified by observed or apparent width, in micrometers (i.e. 80 scratch=80 μm)

Digs: digs are crater-like surface defects with a length/width ratio of approximately 1. This type of defect can occur anywhere on the surface of the IOL and is typically specified in 1/100 of a mm (i.e. 50 dig=0.5 mm).

Pits: pits are surface defects with a length/width ratio of approximately 1. The defect is characterized by a lack of IOL material and occurs inward into the IOL surface. Surface contour changes associated with the defect are typically gradual and smooth.

Voids: voids are defined in areas generally near the edge of an IOL, where a portion of the IOL is missing. Voids form during the IOL molding process when material does not completely fill the mold.

Tears: tears appear as small rips along the edge of the IOLs. They occur mainly in one-piece lenses (FIG. 2). Tears can occur at any location along the edge of the lens between the optic edge and the flange, or around the small anchor holes located near the edge of each flange.

Bubbles: bubbles are internal voids that can occur anywhere in the one-piece IOL and only in the optic zone of the three-piece IOL (FIG. 3). Bubbles are the result of air pockets present in the IOL material when injected into the mold during manufacture.

Dark inclusions: dark inclusions are defined as dark foreign particles suspended in an IOL. Dark inclusions can occur anywhere in the one-piece IOL and only in the optic zone of the three-piece IOL.

Light inclusions: light inclusions are defined as light foreign particles suspended in an IOL. Light inclusions can occur anywhere in the one-piece IOL and only in the optic zone of the three-piece IOL.

Loop damage: loop damage is classified as any kind of damage or malformation of a loop (three-piece IOLs only). The most prevalent type of loop damage include smashed anchors, smashed loops, missing loops and tweezer damage.

Edge flash: edge flash appears as flakes of IOL material attached to the edge of an IOL or as a thin coating covering the surface of loops. Edge flash is the result of excess IOL material flowing out of the mold during manufacture.

Substance: substance defects are defined as small particles adhering to the surface of an IOL that cannot be removed by cleaning. A substance many times appears as fine mist that causes the IOL to have an unusual tint.

Uncured: uncured material primarily occurs near the edge of the optic zone in one-piece IOLs. Uncured material appears as a jelly-like substance on the perimeter of an IOL. This defect develops during the lens curing process due to incorrect heating times or non-uniform heating.

Flow marks: flow marks appear as uneven seams or unusual surface contours in the optic or haptic zone. Flow marks typically form as long, thin defects that follow a smoothly winding direction, or path. Flow marks occur during the molding process when the IOL material cures before flowing is completed.

Rough edges: rough edge defects are classified as edges that remain rough after an IOL has been de-flashed. In terms of appearance, no distinction can be made between the IOLs containing flash and rough edge defects. The cause of the defect is what distinguishes rough edge from flash.

Warp: warped IOL surfaces become wrinkled, especially in the flange area.

Anchor defects: anchor defects are an assortment of defects relating to the position and manner in which the loop anchors are imbedded into the IOL material. Anchors may be too far inward in the IOL, not far enough, they may break the surface of the IOL material, they may not have intimate surface contact or there may be tears in the IOL material near the anchor.

Figure 4:
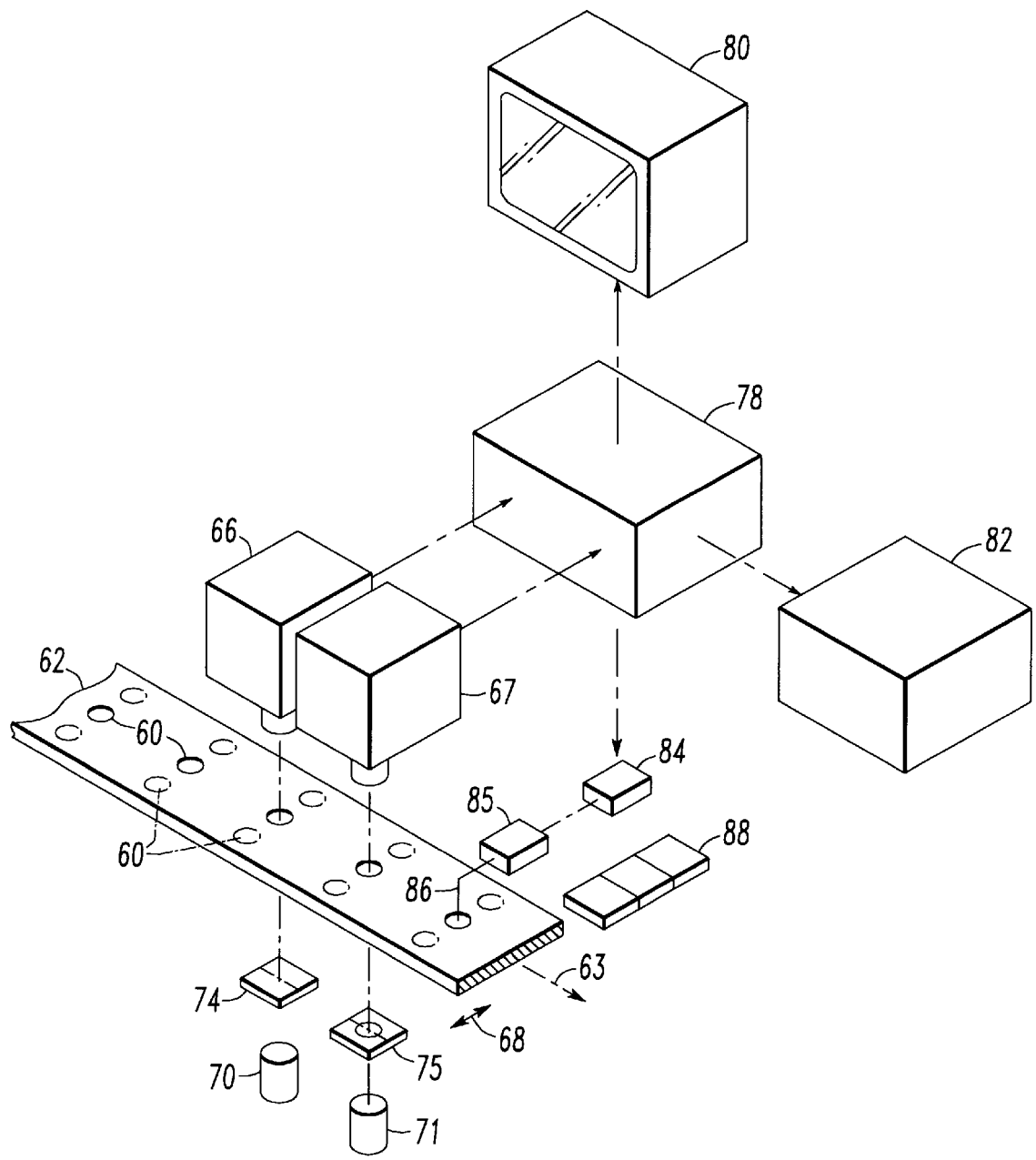
FIG. 4 illustrates apparatus for lens inspection in accordance with one embodiment of the present invention.

FIG. 4 illustrates one embodiment of the invention wherein IOLs to be examined are placed in see-through cavities 60 in a component carrier 62 relatively moveable in the direction of arrow 63. Carrier 62 is indexed such that each IOL is brought under a first camera 66 and then a second camera 67 of a two-camera array. If desired, and as indicated by arrow 68, the carrier 62 may be moved laterally for inspection of components in additional cavities 60', shown dotted.

A light array is constituted by two separate light sources 70 and 71 which are in line with the optical axes of respective cameras 66 and 67 and which direct light through respective masks 74 and 75 of a mask array. The light sources 70, 71 and masks 74, 75 are such that light is projected through an IOL, the image of which is captured by the cameras 66 and 67 and passed on for image analysis by the signal processor 78 which then provides a resulting image for presentation on high resolution display 80. A host computer 82 is provided for operator interaction as previously described.

After the IOLs have been indexed out of the inspection position of camera 67, the signal processor 78 will have determined whether an IOL is satisfactory for shipping, is rejected or requires reworking. In order to separate the IOLs into these, or other categories, the signal processor 78 may command an XYZ positioner 84 to direct a vacuum pick-up device 85, having a thin pick-up tube 86, to obtain an IOL in a cavity 60, and 60' if provided, and place the examined IOL in a respective compartment of a disposition tray 88.

As previously stated, light is projected through the IOLs under test. Although conventional light from a light source may be used, in a preferred embodiment of the invention a light source arrangement is incorporated which provides diffused light for the IOL examination. FIGS. 5A and 5B serve to illustrate this concept. In FIG. 5A, a light source 90 projects light through a clear plate 92. A single ray of light, as represented by arrow 94 passes through the clear plate 92 and emerges as a single ray 94'.

In FIG. 5B however a similar light source 96 projects light through a diffuser plate 98 and a single ray of light, as represented by arrow 100 emerges from the diffuser plate as a plurality of rays 100' emerging in different directions and with different intensities, depending upon the type of diffuser plate utilized. The diffuser plate may be placed over the light source, or, as utilized herein, may be integral with the masks that are used.

Figure 6B:
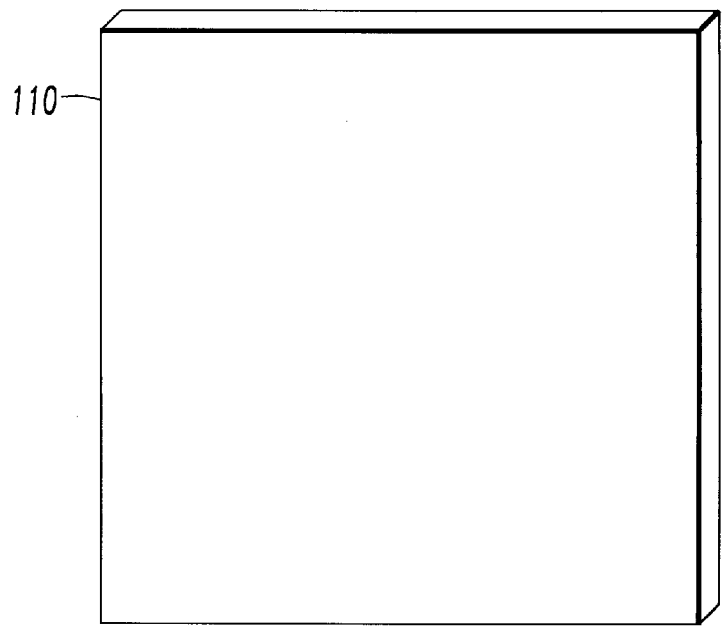

One type of mask which is utilized in the present invention is a bright field mask such as mask 102 illustrated in FIG. 6A. The mask 102 is constituted by a diffuser plate 104 with a light blocking portion 106 and a central light transmitting portion 108. The diameter of the central portion 108 is such that the image of the IOL optic zone region will have a bright background. As an alternative, and as shown in FIG. 6B, and as used in FIG. 4 (item 74), the bright field mask 110 may be constituted by a diffuser plate alone (or a conventional light source alone if diffused light is not used).

Figure 7:
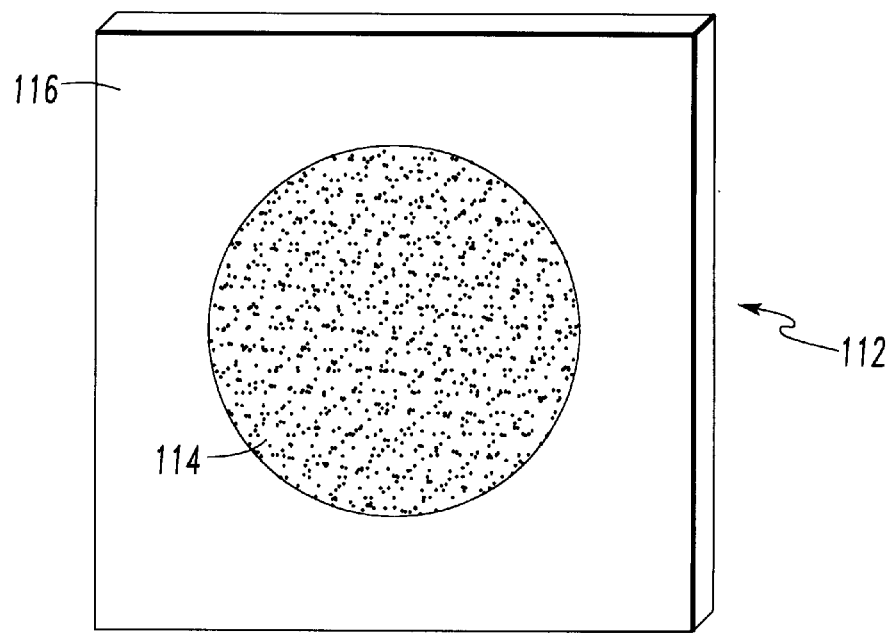
FIG. 7 is a type of dark field mask that may be used herein.

FIG. 7 illustrates a typical dark field mask 112, such as used in FIG. 4 (item 75), having a central light blocking portion 114, surrounded by a light transmitting portion 116. The diameter of the central portion 114 is such that, in the absence of defects, the IOL being imaged will be completely blocked from light passing through the mask in a direction parallel to the optic axis of the camera. This mask 112 is the opposite of the mask 103 illustrated in FIG. 6A.

Figure 8A:
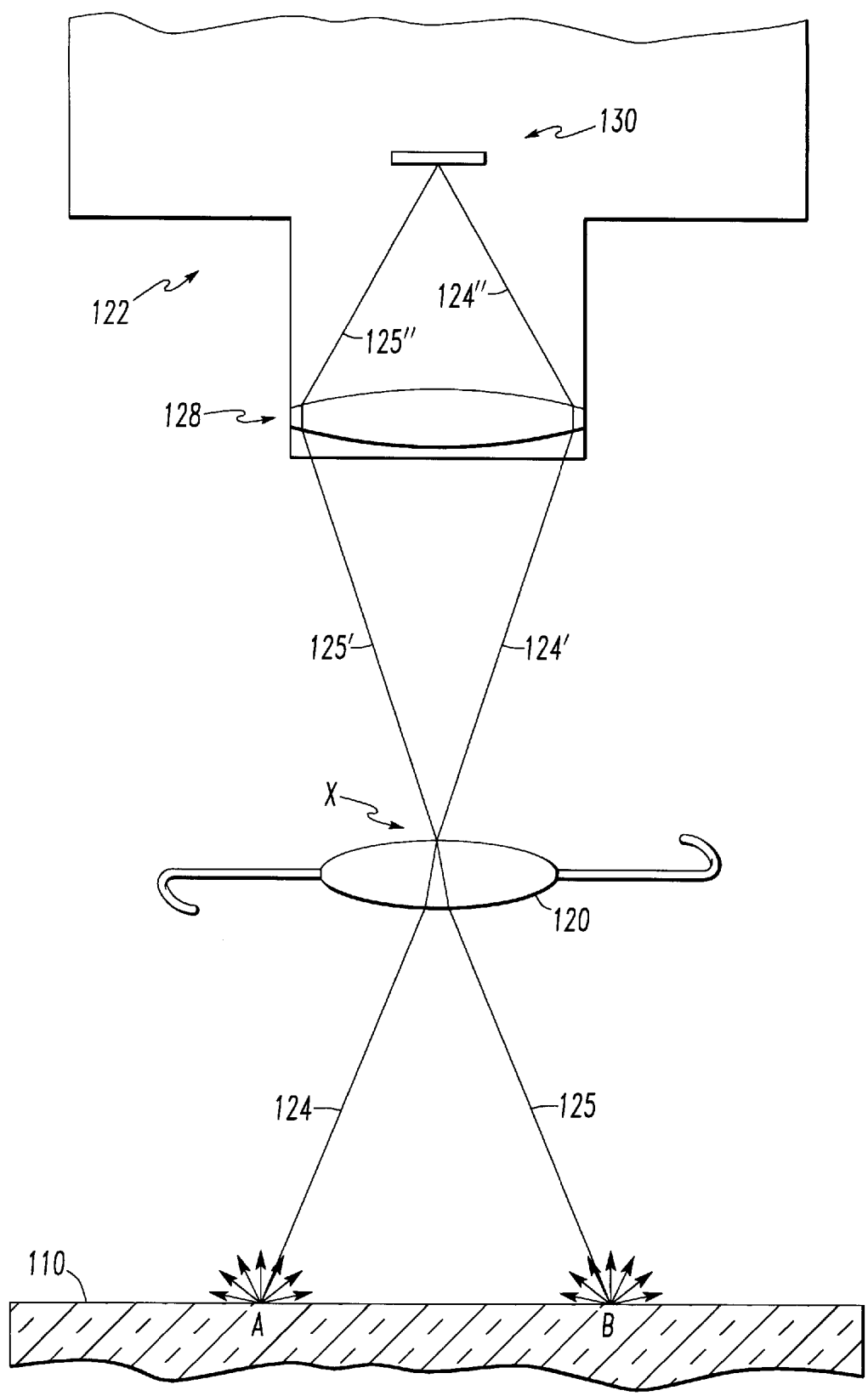
FIGS. 8A and 8B are ray diagrams showing the effect of using a bright field mask for detecting defects.
Figure 8B:
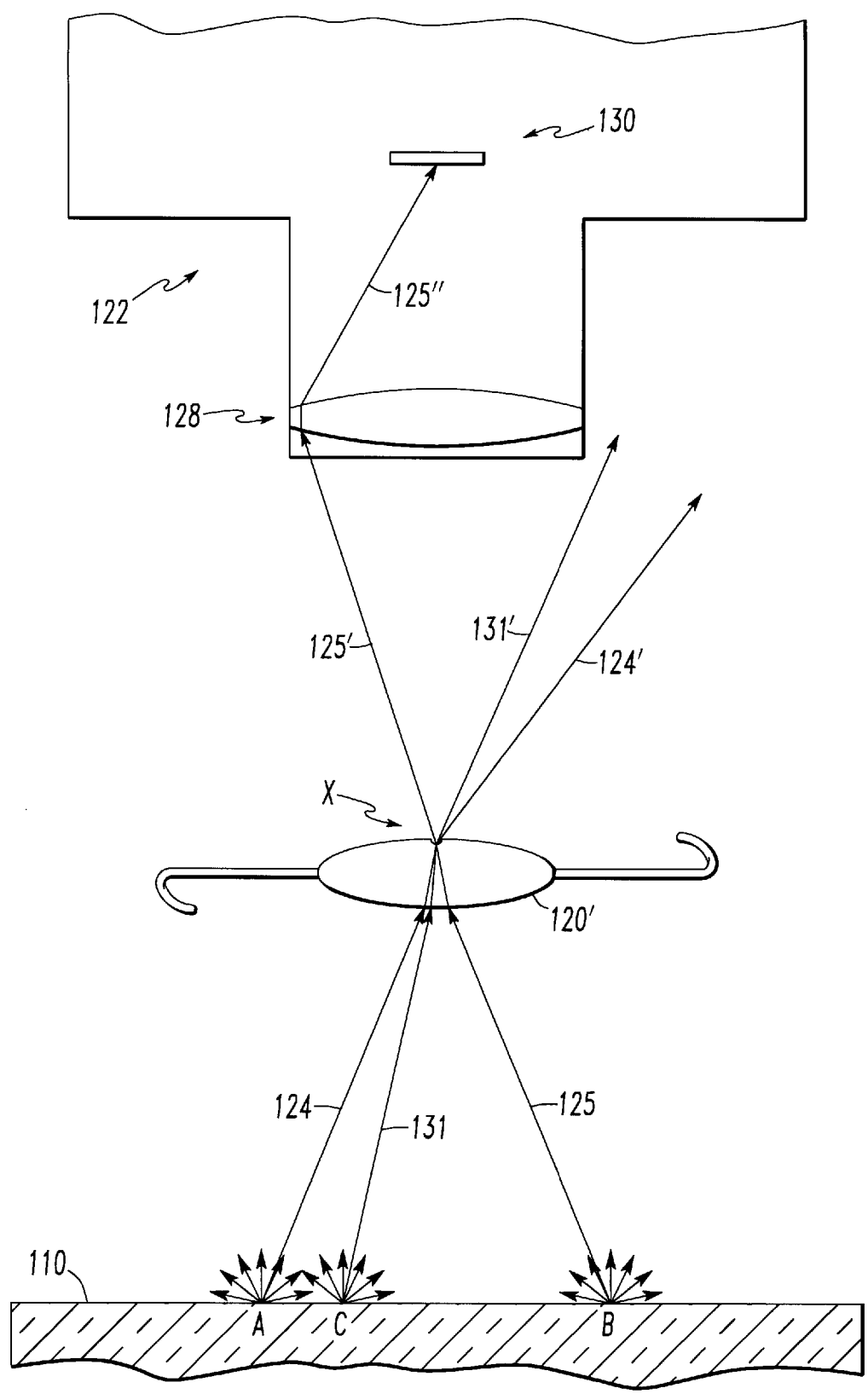

The principle of operation of the bright field mask is illustrated in FIGS. 8A and 8B. In FIG. 8A a three-piece IOL 120, having no defects, is positioned at the object plane of camera 122. Located between the IOL 120 and a light source (not shown) is a bright field mask such as mask 110 illustrated in FIG. 6B. Two rays of diffused light 124 and 125 are illustrated as emanating from respective points A and B on mask 110. These particular light rays exit IOL 120 at point X as rays 124' and 125' and strike a camera lens system represented by numeral 128. The refracted rays 124" and 125" are focused to a point on a CCD array 130, for example, located at the image plane of the camera 122.

All light emitted from the mask 110 between points A and B that strike IOL 120 and emerge from point X will be intercepted by the camera lens system 128 and will be imaged. The same is true of all light rays between points A and B which emerge from the surface of the IOL.

FIG. 8B illustrates the same arrangement as FIG. 8A except that the IOL 120' has a defect at point X. In addition, a third ray of light 131 from point C on mask 110 is illustrated. The complex contour found at the defect point X causes light that originally would be intercepted by the camera lens system 128, for example rays 124' and 131', to be reflected and/or refracted in directions that are no longer intercepted and imaged. Although some rays, such as 125" may still be imaged, the net effect is that less light (and in some cases no light) is imaged and point X in the final image appears dark, as will all other points of the IOL where defects exist.

This bright field process is particularly useful for detecting edge defects such as flash, tears and voids and interior surface defects such as dark inclusions, digs and scratches.

Figure 9A:
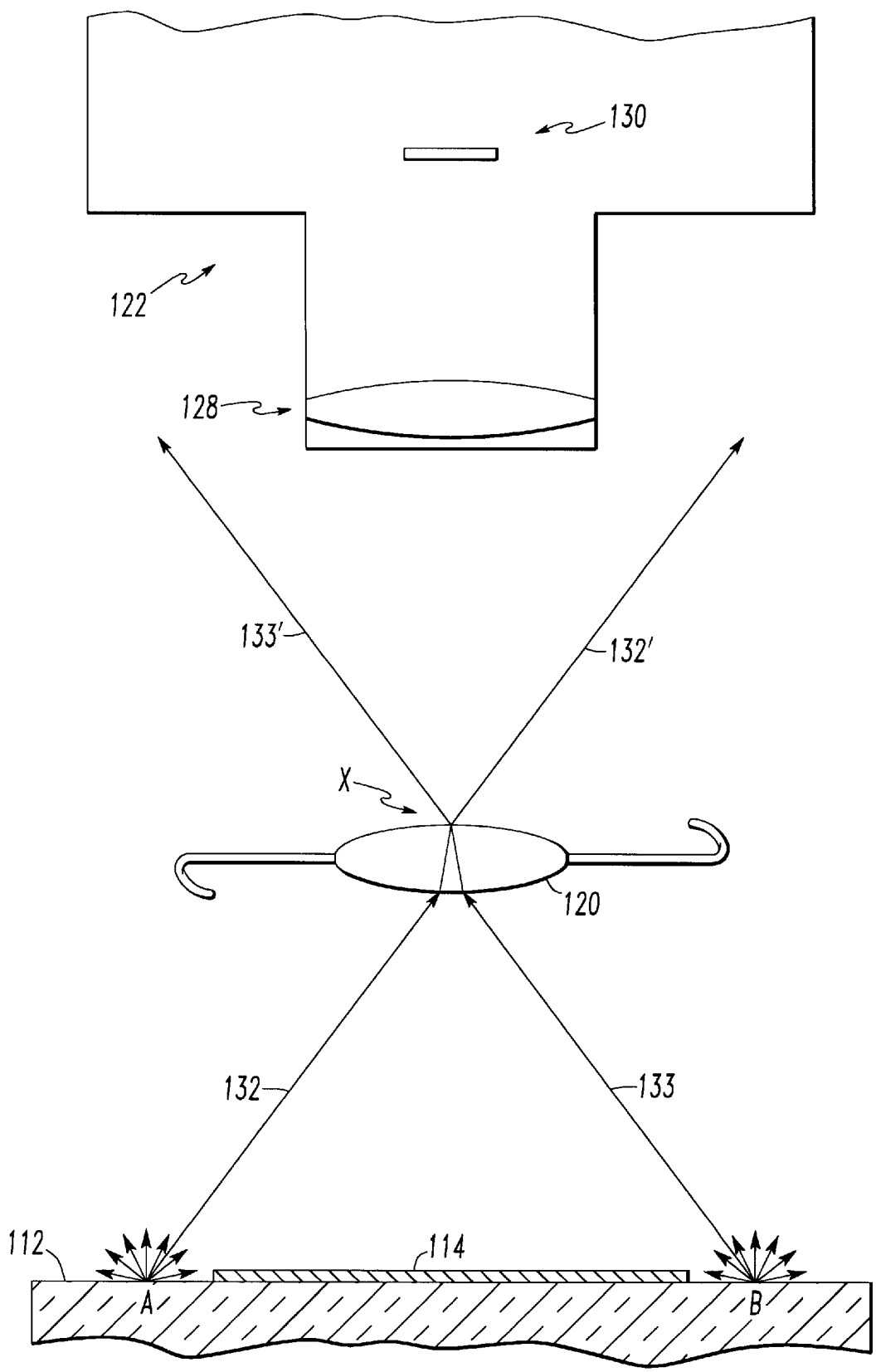
FIGS. 9A and 9B are ray diagrams showing the effect of using a dark field mask for detecting defects.
Figure 9B:
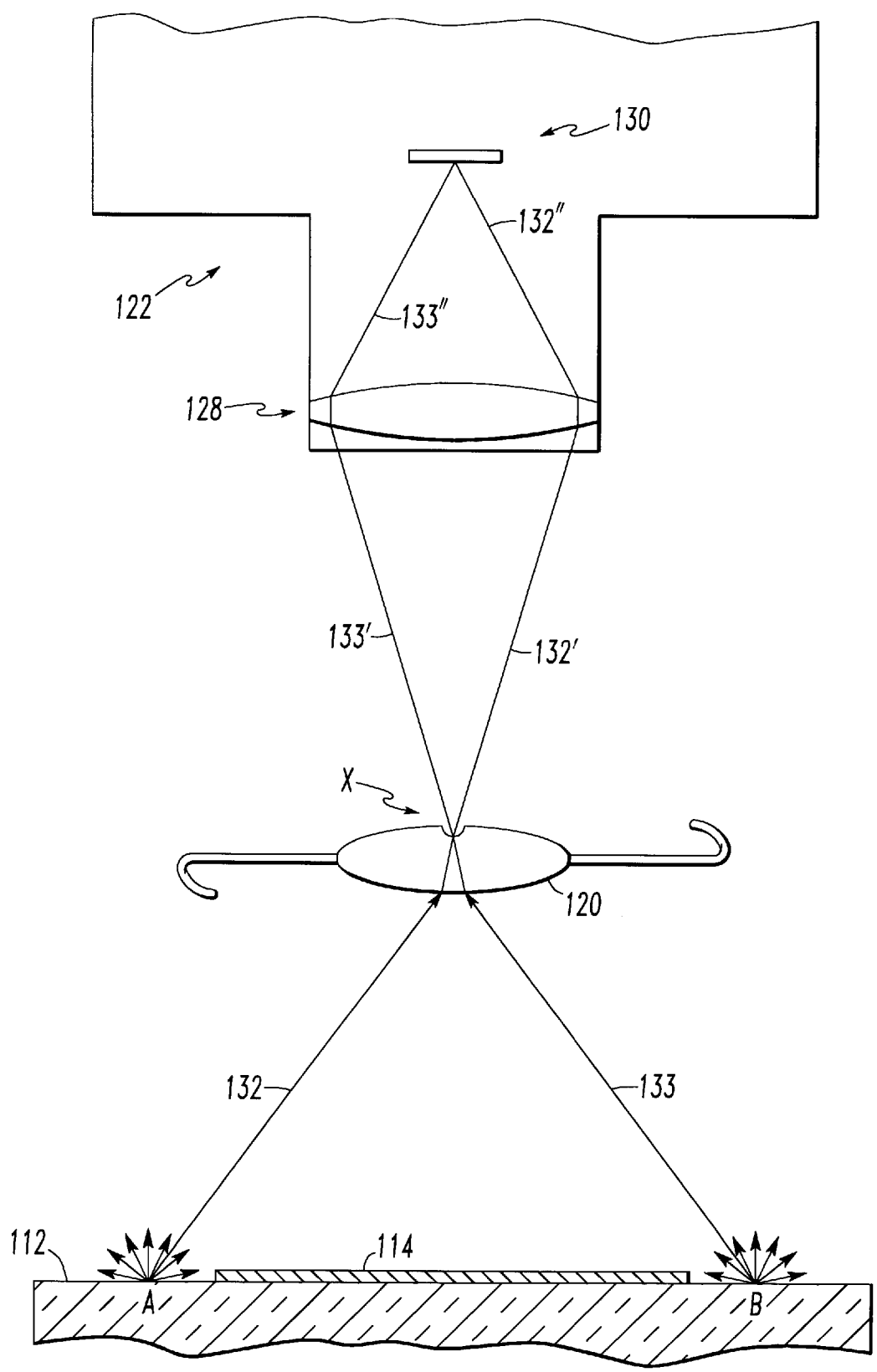

The principle of operation of the dark field mask is illustrated in FIGS. 9A and 9B. In FIG. 9A the three-piece IOL 120, having no defects, is positioned at the object plane of the same camera 122. Located between the IOL 120 and a light source (not shown) is a dark field mask such as the mask 112 illustrated in FIG. 7. By way of example, for a 22 Diopter IOL 120 with a camera 122 having a 60 mm focal length lens with a field of view of 15 mm by 15 mm, and the mid plane of the IOL located 30 mm above the mask 112, the central light blocking portion 114 of the mask 112 may have a diameter of 30 mm.

Two rays of diffused light 132 and 133 are illustrated as emanating from respective points A and B on either side of the central light blocking portion 114 of mask 112. These particular light rays exit IOL 120 at point X as rays 132' and 133' which are not intercepted by the lens system 128 of camera 122 and are therefore not imaged such that point X will appear dark at the CCD 130.

FIG. 9B illustrates the same arrangement as FIG. 9A except that the IOL 120' has a defect at point X. Light emitted from outside of the light blocking portion 114 of the mask 112 which originally would not be intercepted by the lens system of camera 122 now strikes the defect point X and is reflected and/or refracted in a direction that is now intercepted by the camera lens system 128 and is imaged as a bright spot, as will all other points of the IOL where defects exist.

This dark field process is particularly useful for enhancing edge defects such as flash, uncured material, tears and large voids. Interior surface defects are enhanced such as dark inclusions, light inclusions, digs, scratches, bubbles, uncured material, warp, tears, and various loop damage.

Figure 10:
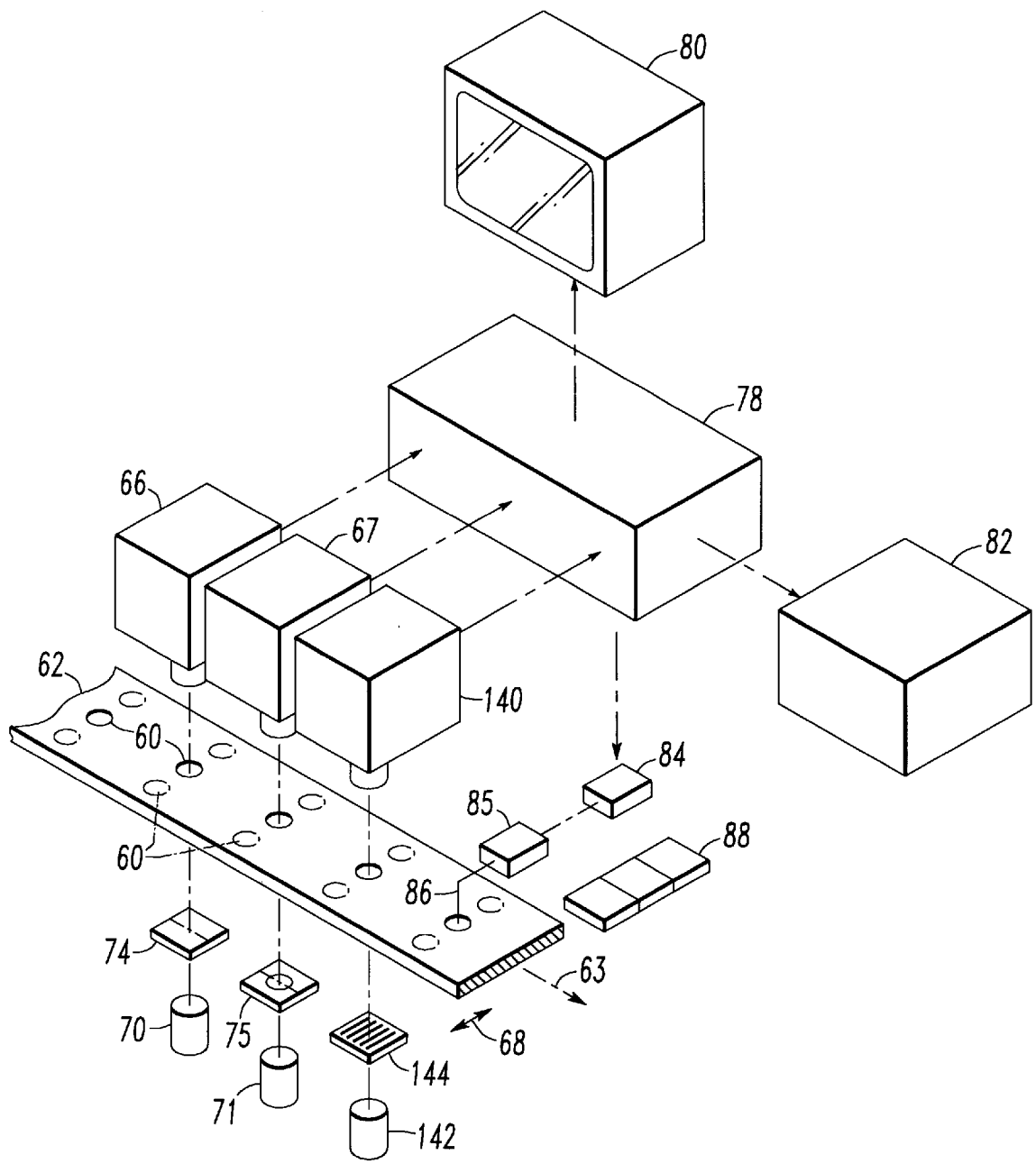
FIG. 10 illustrates another embodiment of the present invention, which additionally uses a transition mask for inspection.

There is a class of IOL defects that show up very poorly or not at all when using either the bright field or dark field technique. The class of defects include flow defects, warp defects, pit defects and some anchor placement defects. These defects are characterized by very subtle changes in the contour of the IOL. In a preferred embodiment of the invention therefore a third mask is utilized to provide for a more extensive examination procedure. By way of example, a third inspection position is provided to the arrangement of FIG. 4. This is illustrated in FIG. 10 wherein a third camera 140 has been added for imaging IOLs through which diffused light is transmitted by the combination of third light source 142 and a third mask, transition mask 144.

Figure 11:
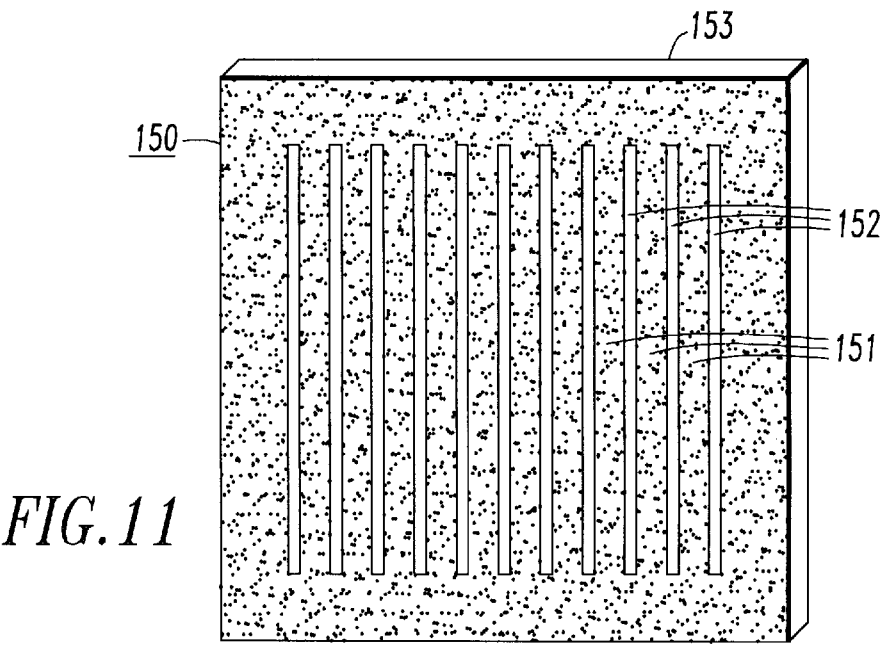
FIG. 11 is one type of transition mask which may be used herein.

A transition mask as used herein is composed of alternate bands of light transmitting and light blocking portions. In one embodiment these alternating bands take the form of stripes as illustrated by transition mask 150 in FIG. 11. Dark stripe portions 151 and clear stripe portions are positioned upon a diffuser plate 153.

Figure 12:
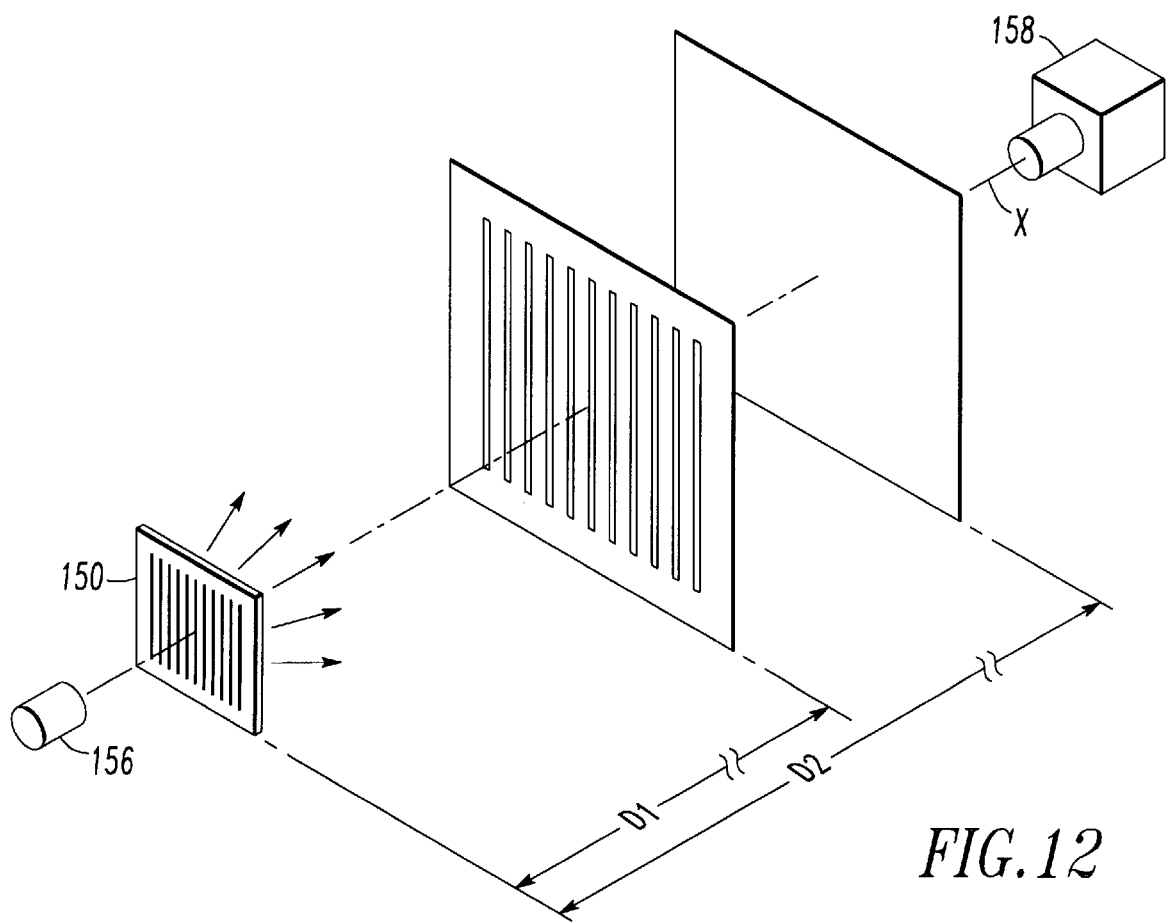
FIG. 12 serves to illustrate the patterns obtained using the transition mask of FIG. 11.

The nature of the transition mask is such that the diffused light from the clear portions between the dark stripes interact in a constructive and destructive manner at different distances from the mask. With reference to FIG. 12, the combination of light source 156 and transition mask 150 will produce a cyclical pattern going from stripes to a uniform pattern, as a function of distance. This is shown for two different distances D1 and D2. At D1 the pattern is comprised of distinct stripes, while at distance D2 the pattern is essentially uniform. A camera 158 positioned along the optical axis X can be focused to an object plane where the pattern of constructive and destructive light rays will show up, at the camera image plane (where the CCD array is located) as a striped pattern, as an essentially uniform pattern or somewhere in-between, depending on the position of the camera along the optical axis. For this to occur the light striking the CCD array of the camera 158 should be monochromatic light such as may be provided by a monochromatic light source or an appropriate filter positioned on the optical axis.

Figure 13:
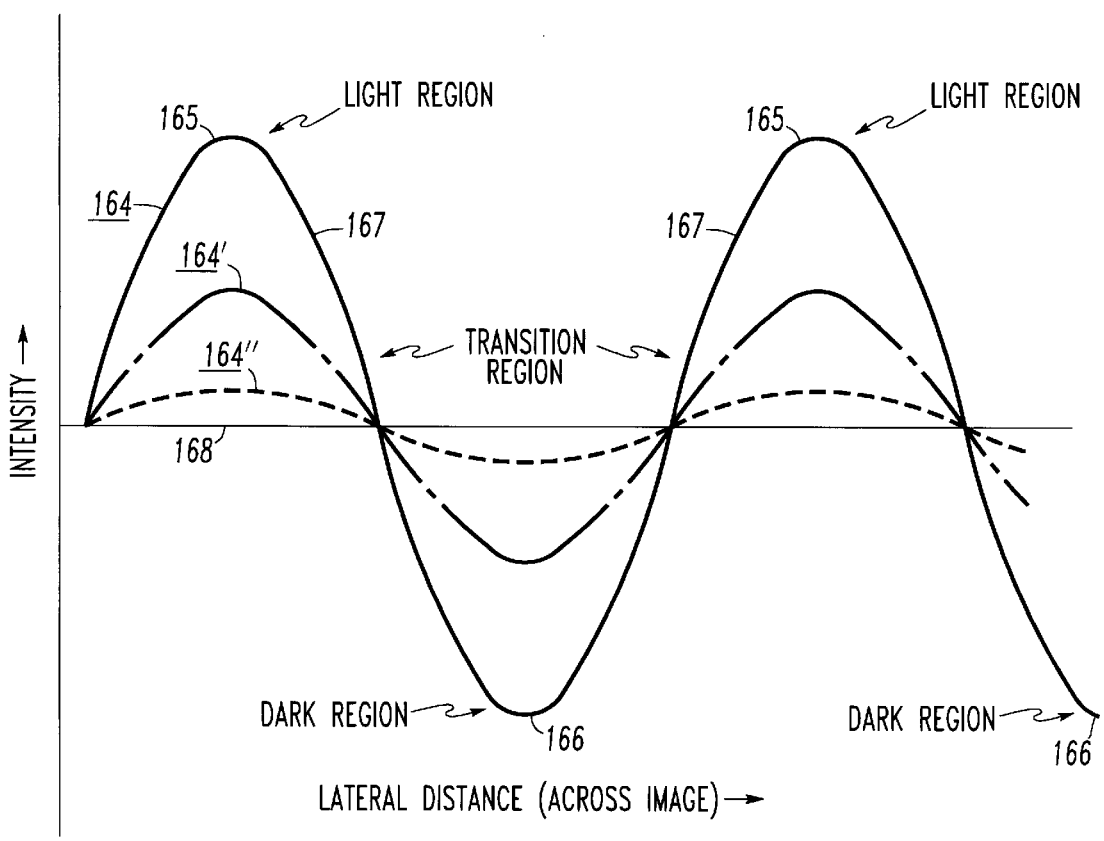
FIG. 13 shows the variation in amplitude as a function of distance for the arrangement of FIG. 12.

The cyclical nature of the pattern caused by the transition mask 150 may be demonstrated with reference to FIG. 13 wherein curve 164 represents the intensity of light with respect to lateral distance at one point along the optical axis. The positive peaks 165 of curve 164 represent maximum intensity and are indicative of clear stripes, whereas the negative peaks 166 represent minimum intensity and are indicative of dark stripes. The transition from clear to dark stripes is represented by the sloping portion 167 of the curve and it is in this region that defects are most pronounced.

At a different position along the optical axis, the intensity of the clear and dark stripes is diminished, as represented by curve 164'. Curve 164" shows the intensity at still another location, whereas the horizontal line 168 represents an essentially uniform pattern at some other position.

Figure 14:
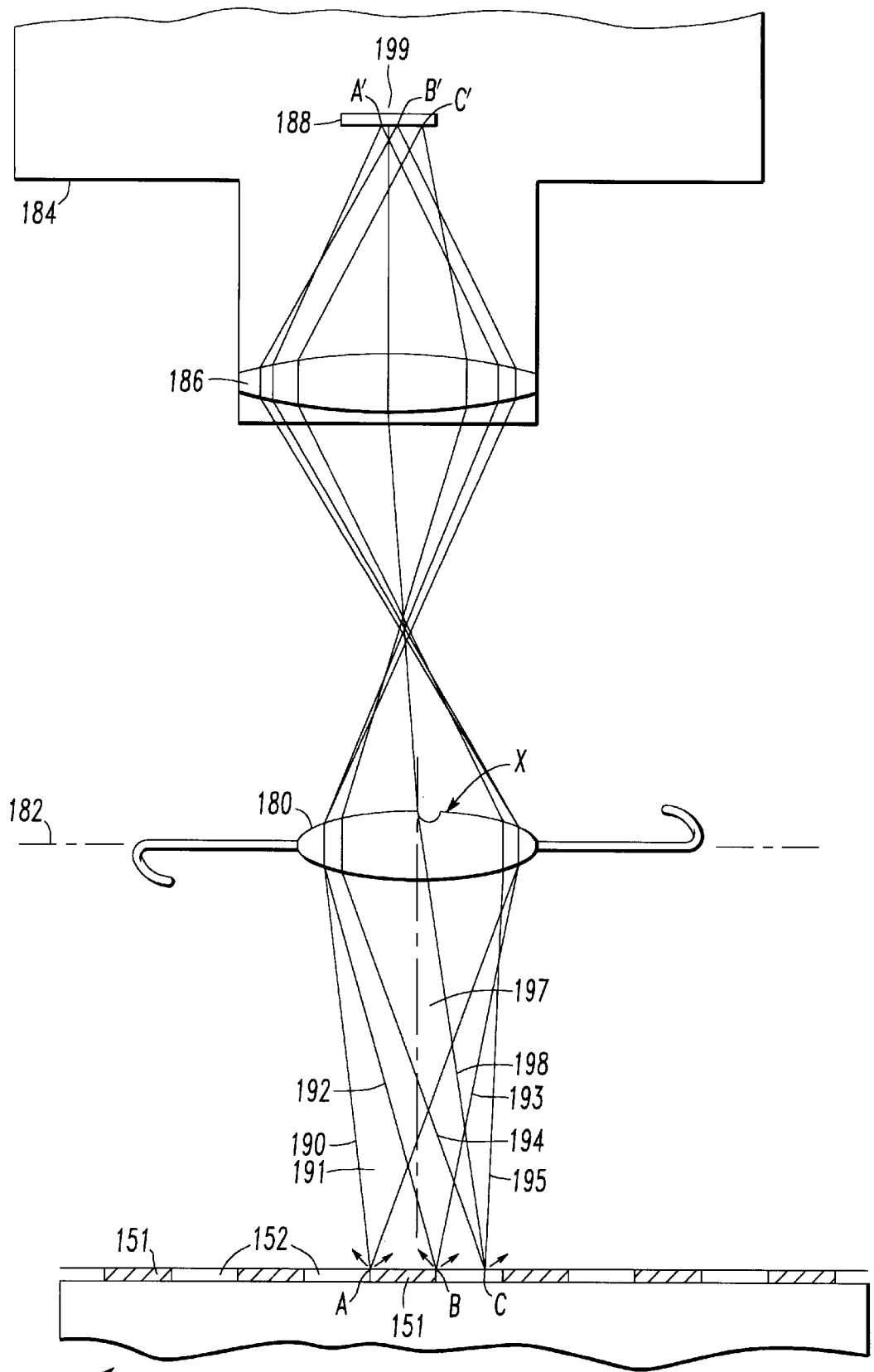
FIGS. 14 and 14A are ray diagrams illustrating the operation of a transition mask.

When using the transition mask, and as illustrated in FIG. 14, an IOL 180 is placed at the object plane 182 of the camera 184, having a lens system 186 and a CCD array 188 at its image plane. The combined IOL and camera lenses form a somewhat out of focus image of the transition mask 150 onto the image plane, and it is this image which is disrupted by defects in the IOL 180.

One form of disruption is the redirection of incident light away from or towards the camera lens, depending on the defect type and location. The pattern of alternating dark and clear stripes can be thought of as small regions that utilize the bright field and dark field principles previously described. The redirection of light is optimized by the alternating clear and dark stripe pattern because all defects are in close proximity to a dark field/bright field boundary. In this regard, the stripe spacing is selected to be small to maximize this effect. By way of example, for a 22 Diopter IOL 180, in FIG. 14, with a camera 184 having a 60 mm focal length lens with a field of view of 15 mm by 15 mm, a transition mask 150, located 70 mm behind the IOL, may have a dimension of 40 mm by 40 mm with a stripe spacing of less than 1 mm, for example 0.5 to 0.8 mm.

In FIG. 14 rays 190 and 191 emanating from point A, just at the edge of a dark stripe 151, image at point A' on the CCD array 188. Similarly, rays 192 and 193 from point B at the other edge of stripe 151 and rays 194 and 195 from point C image at points B' and C', respectively. A defect in the IOL 180 at point X is above a dark stripe 151, as indicated by dotted line 197. A ray of light 198 from point C passes through the IOL 180 at point X and is deflected by the defect so as to be imaged as a bright region in the normally dark area 199 between points A' and B' on the CCD array 188.

For a given localized area all extraneous light that might degrade defect contrast is minimized since the dark stripes 151 on either side of the clear stripes 152 prevent extraneous light from more distant clear stripes from washing out the defect contrast. The defect may additionally show up in the transition region and may even transcend several stripes. That is, different classes of defects will cause different distortions of the stripe pattern, depending upon the type, location, size and severity of the lens defect.

Another mechanism exists that causes subtle surface type defects to distort the image and thus allow for their detection. As the surface contour of the desired lens deviates, the refractive power of the defective area changes. The different refractive power of the defective area, in turn, causes a localized shift of the mask stripe pattern such that there is a clear disturbance in the resulting image. This mechanism essentially is equivalent to an unwanted small lens being superimposed, or inserted, onto an existing lens within the optical system. If this unwanted small lens has an optical axis that differs from the main lens, it will image its target off axis with respect to the main lens and will cause detail to shift in that area of the image.

Figure 14A:
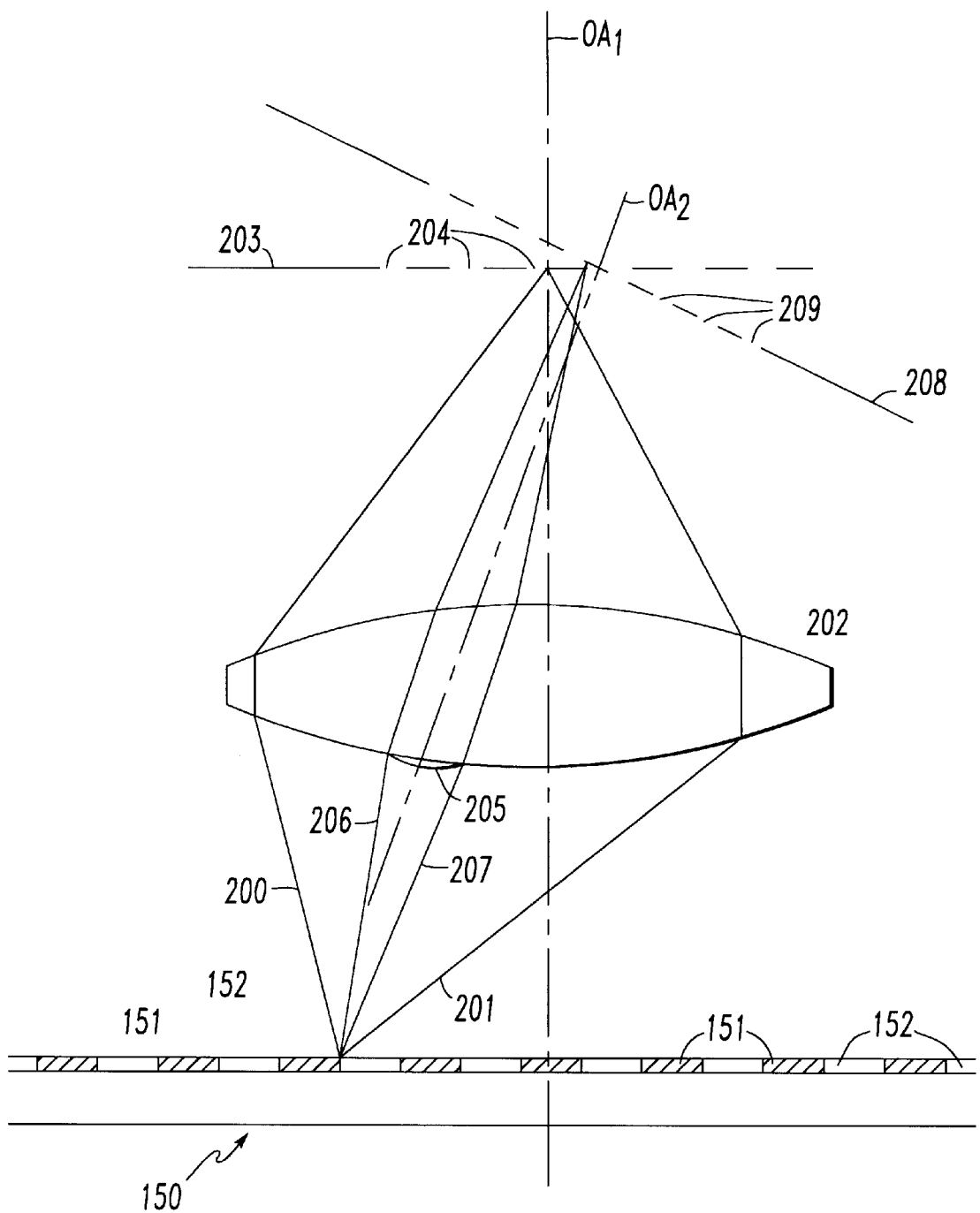

More particularly, FIG. 14A illustrates the principles involved with this detail shift. In FIG. 14A, for clarity, the camera and CCD array are not shown. Rays 200 and 201 emanate from point A on the transition mask 150, proceed through IOL 202, having an optical axis $OA_1$, and are imaged at point A' on the IOL's image plane 203, (The CCD array would normally be located at this image plane) at which is formed a striped pattern, as indicated by reference numeral 204.

A defect or protrusion 205 forms a small lens having a different optical power than IOL 202 and with an optical axis $OA_2$, of different orientation than the optical axis $OA_1$, of IOL 202. Rays 206 and 207 also emanating from point A on the transition mask 150 proceed to point A" on the image plane 208 of lens 205 and which image plane also has a striped pattern, as indicated by reference numeral 209.

In the regions where the image plane 208 of the lens 205 is in close proximity to the image plane 203 of the IOL 202, the resulting image will be a combination of the two and will result in detail shifts.

Figure 15:
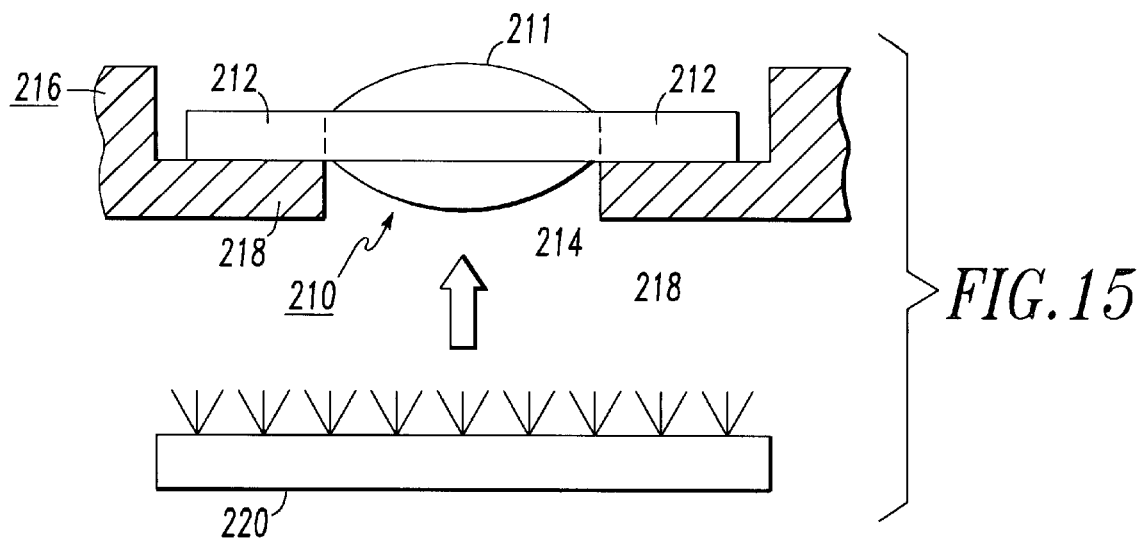
FIGS. 15 and 15A illustrate the examination of a lens inside and outside of a carrier, respectively.

The distortion of a light ray path by one or more various defects in the haptic zone of the IOL will also be detected by utilizing the principles described with respect to the bright field, dark field and transition masks. By way of example, FIG. 15 illustrates an IOL 210 of the variety shown in FIG. 2, having a central optic zone 211 and a flat haptic zone 212. The lens portion (211) of the IOL 210 sits within an aperture 214 of a carrier 216 while the flat portion (212) rests on a peripheral ledge 218. With this arrangement, light from a mask 220 is blocked by the ledge 218 and the haptic zone cannot be imaged at the same time as the optic zone.

Figure 15A:
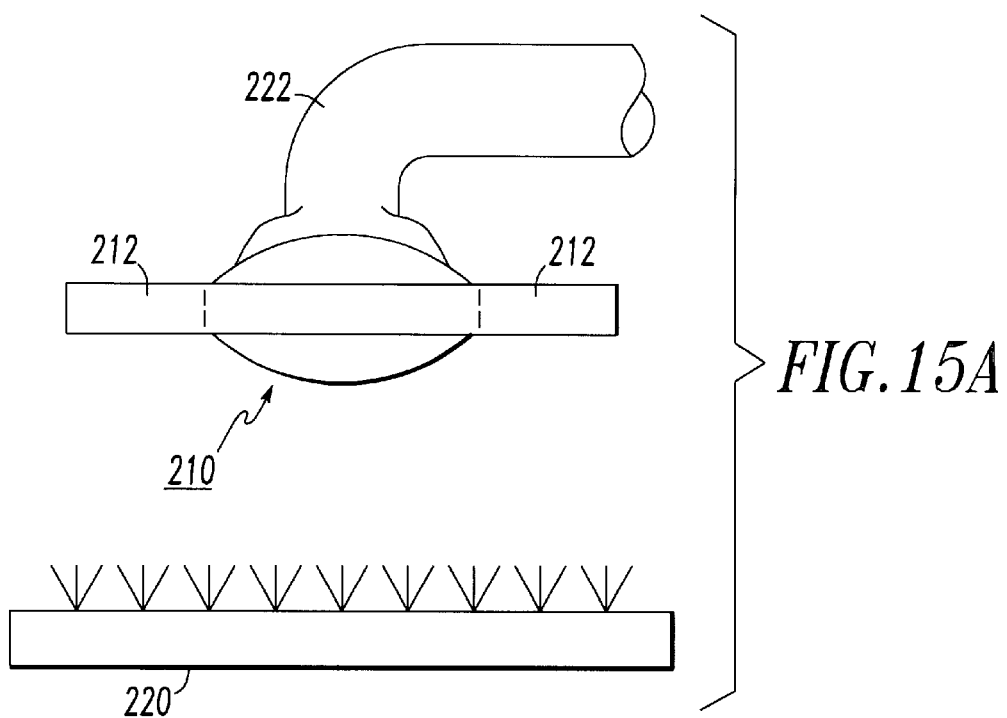

If the haptic zone is to be examined for defects, and as illustrated in FIG. 15A, the IOL 210 may be removed from the carrier 216 by means of a vacuum pick up tube 222 similar to tube 86 of FIG. 10, and the carrier moved away so as to allow imaging of the haptic zone 212. As will be seen in FIGS. 21C, 21D, 22C, 22D, 23C, and 23D, the image will include a section which is completely blocked by the tube 222, however this section will have been previously imaged.

When examining the haptic zone, or any flat object, the camera is placed at a height to view an object plane where the transition pattern is imaged as an essentially uniform pattern at the camera CCD array. The lens is placed at a position slightly above this object plane, as more fully described and claimed in copending application Ser. No. 09/055,536, filed Apr. 6, 1998, and assigned to the same assignee as the present invention.

In the embodiment of the invention described in FIG. 10, three inspection stations are utilized for examining the IOLs, with each station including a separate camera, a separate light source and a separate mask. In another embodiment of the invention, and as illustrated in FIG. 16, a single inspection station having a single camera and a single light source may be used for detecting defects in the IOLs.

Figure 16:
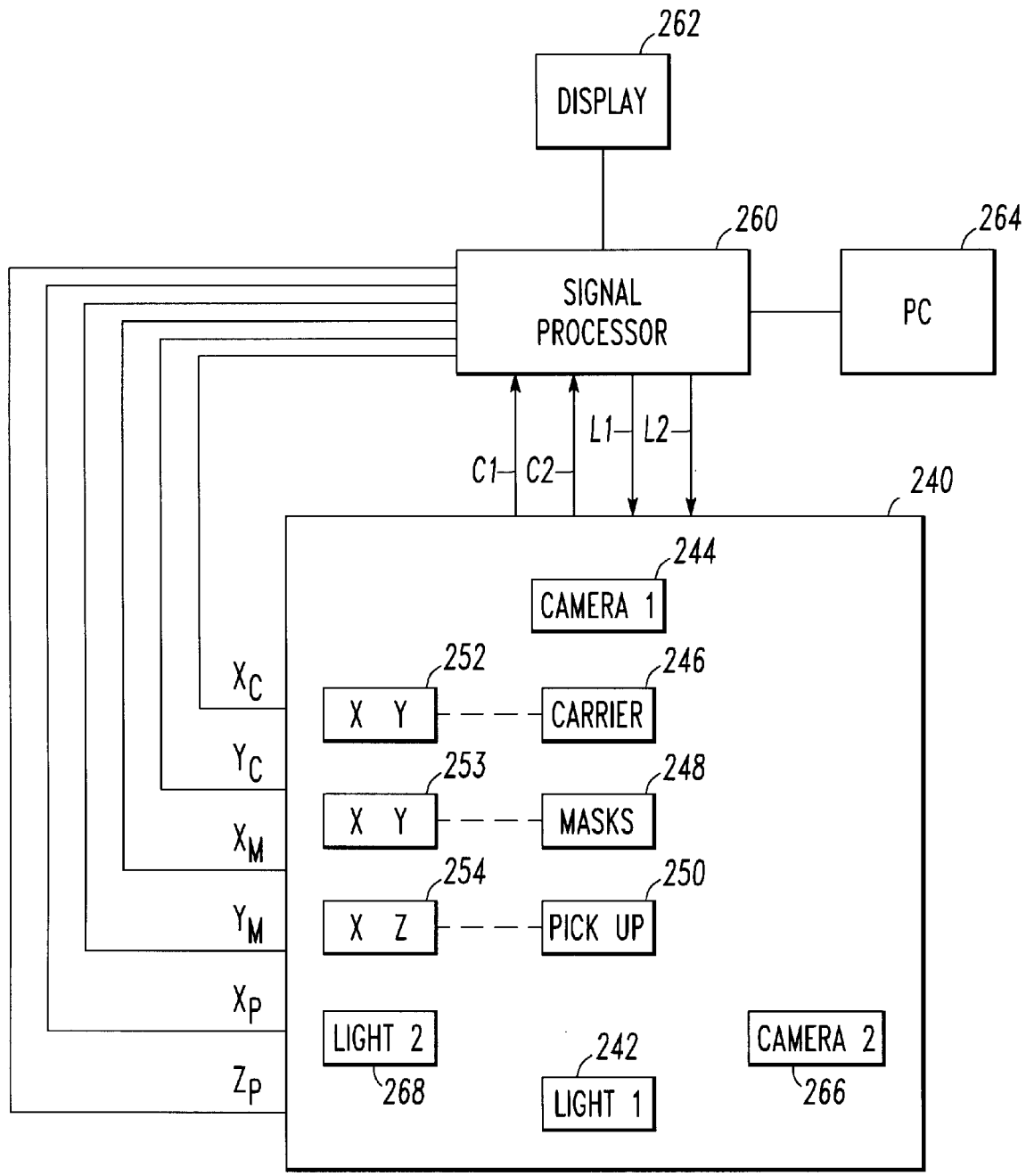
FIG. 16 is a block diagram of another embodiment of the present invention.

As seen in the block diagram of FIG. 16, inspection station 240 includes a first light source 242 located in line with the optical axis of a camera 244, as is an IOL carrier 246. A mask array 248 includes a plurality of different masks and is moveable to selectively position a desired one of the masks into the optical field. In order to remove individual IOLs from the carrier, a vacuum pick-up device 250 is included, as previously described with respect to FIGS. 4 and 10.

The carrier 246 and mask array 248 are moveable in two dimensions by means of respective X-Y positioners 252 and 253, while the vacuum pick-up device 250 is moveable in a horizontal and vertical direction by means of X-Z positioner 254.

A signal processor 260 is operable to provide the necessary drive signals $X_cY_c$, $X_mY_m$, and $X_pZ_p$ to the respective positioners 252 to 254. The signal processor additionally triggers the light source at the proper time by means of a signal on line $L_1$, and receives the output from the camera 244, via a signal on line $C_1$, for image analysis and for displaying the image on display 262. Operator interaction is provided by means of a host computer 264.

Figure 17:
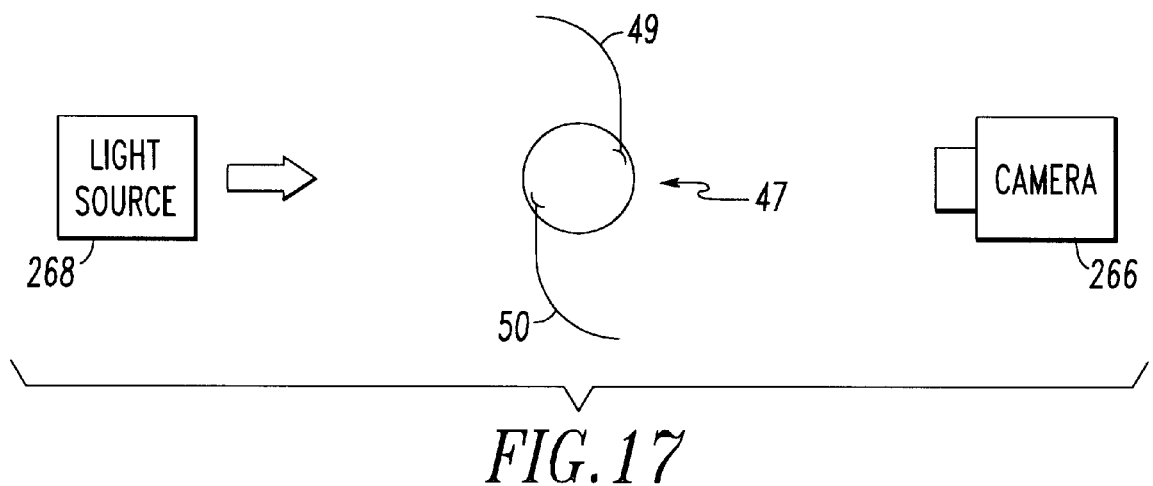
FIG. 17 is a view of a test which may be performed on one type of lens under test.

For examining a three-piece IOL, as illustrated in FIGS. 3 and 3A, it may be desirable to examine the loops to see if they are bent or otherwise deviate from a mid plane by more than a predetermined amount. With additional reference to FIGS. 17 and 17A, a second camera 266 is provided, along with a second light source 268. In FIG. 16, a signal on line $L_2$ from signal processor 260 controls the light source 268 and the output from camera 266 is provided via line $C_2$.

Figure 17A:
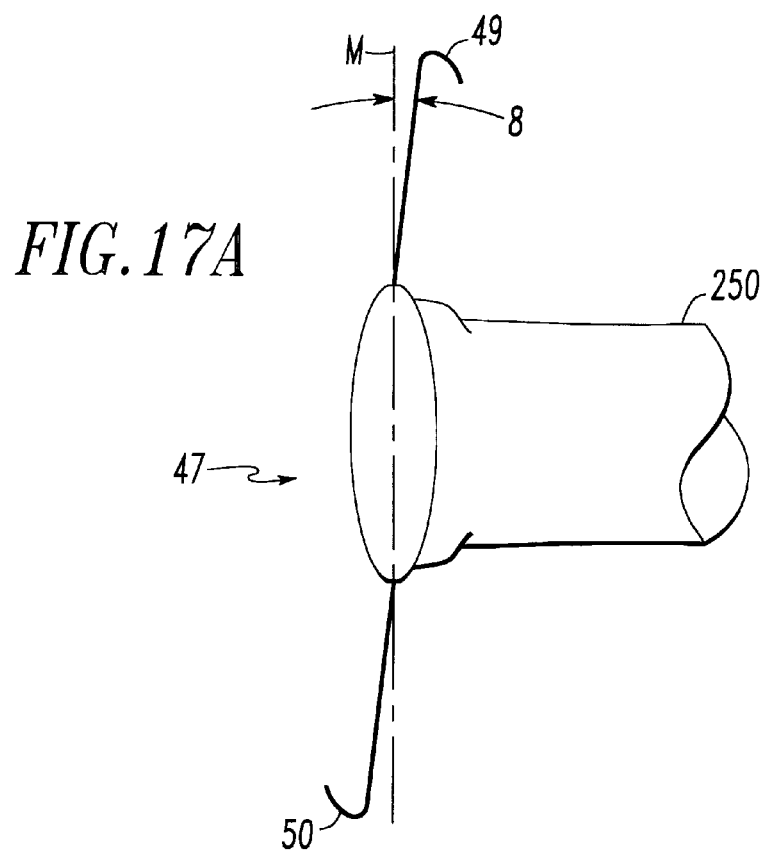
FIG. 17A illustrates the lens of FIG. 17 as it is held for viewing.

The IOL 47 of FIG. 3 is positioned such that it is back lit by diffused light from the light source 268 with the camera 266 looking at the side view of the IOL, as in FIG. 17A. For this test, no mask is required and the IOL is removed from the carrier and held in position by means of the pick-up device 250. The camera 266 captures an image such as in FIG. 17A and the signal processor 260 will examine the image and determine if either of the loops 49 or 50 deviate by more than a predetermined angle θ, as measured from a mid plane M.

Figure 18:
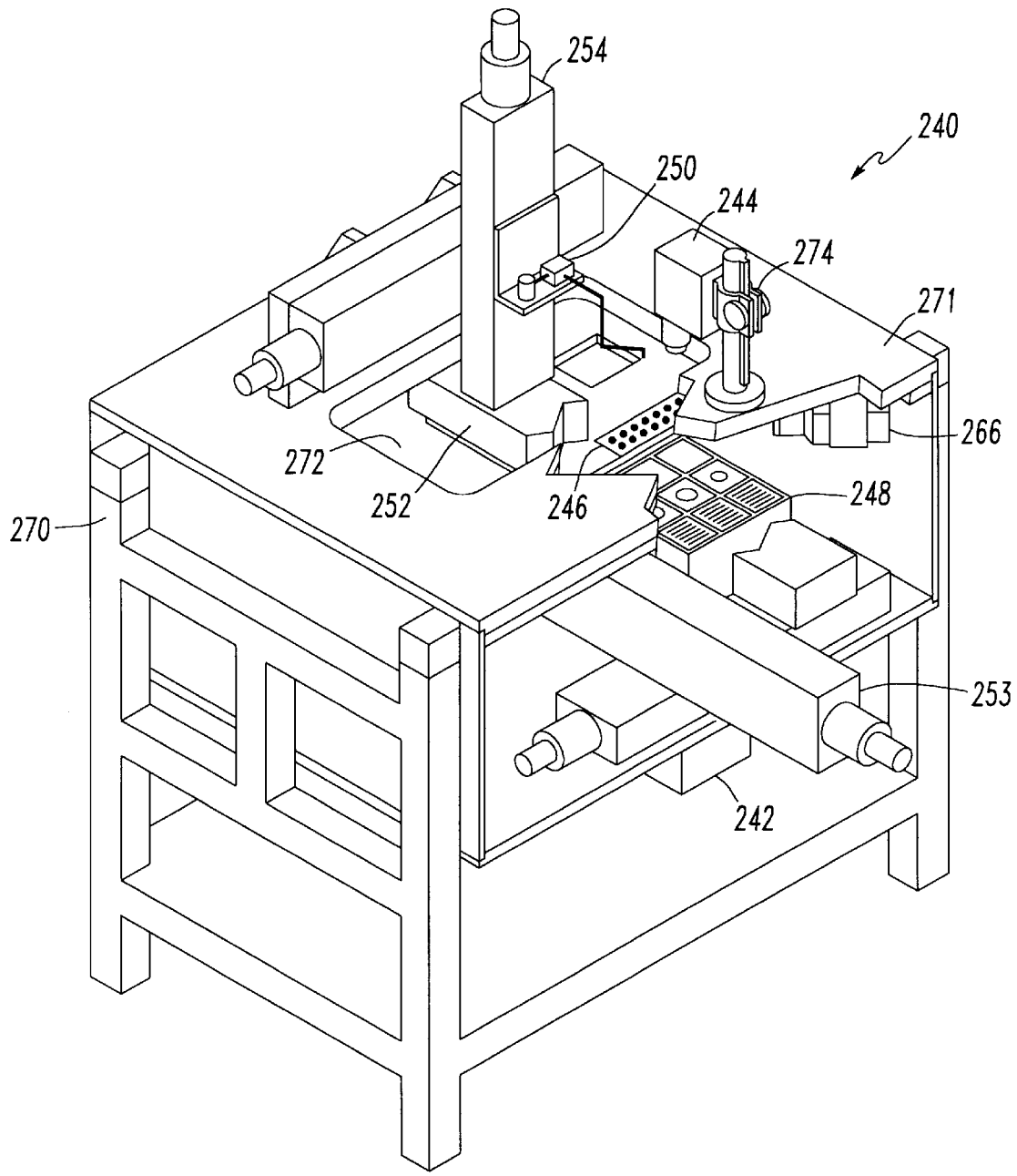
FIG. 18 illustrates apparatus in accordance with the embodiment shown in FIG. 16.

The arrangement of FIG. 16, in one component form embodiment, is illustrated by way of example in FIG. 18. The inspection station 240 includes a support table 270 (shown with a portion broken away) having a top 271 with a central aperture 272 through which projects the X-Z positioner 254 attached to pick-up device 250. Camera 244 is vertically moveable on holder 274 secured to the top 271, while second camera 266 is secured to the undersurface thereof.

Figure 19:
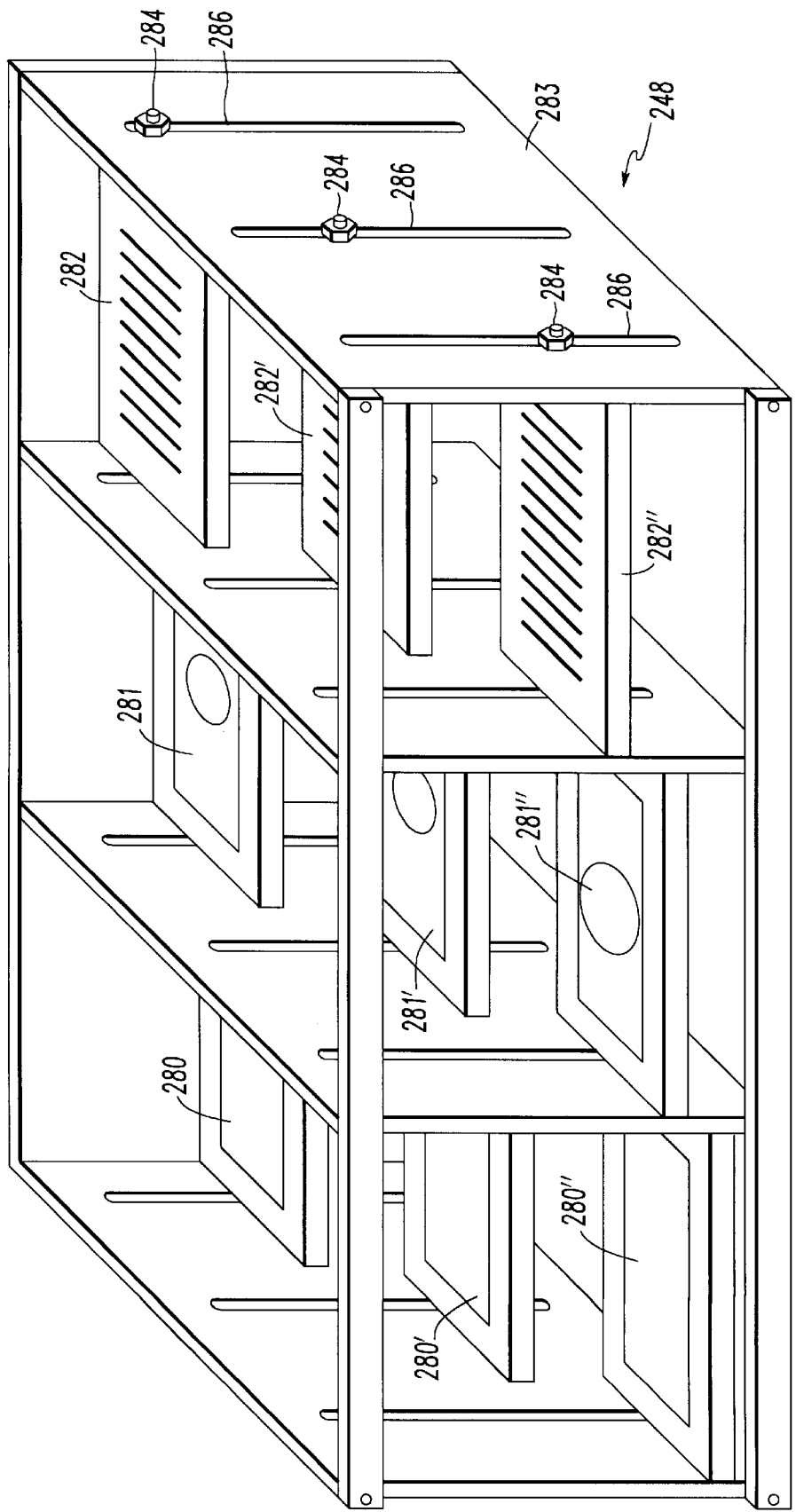
FIG. 19 illustrates a mask array of FIG. 18 in more detail.

Upon command of the signal processor 260 (FIG. 16) light source 242 will project a flash of light toward the camera 244 through the aperture 272 for each of the three masks utilized. This light will pass through a particular mask placed in the optical path by positioner 253, and through an IOL under test. After irradiation with one mask in place, the mask array 248 is indexed to bring subsequent masks into position. If however, a bright field image is obtained first, one has the option of leaving the bright field mask in place while the subsequent dark field and transition mask images are obtained. One embodiment of a mask array is illustrated in more detail in FIG. 19.

Mask array 248 includes at least one bright field mask 280, at least one dark field mask 281 and at least one transition mask 282, all contained within a holder 283. For examining a variety of different IOLs with differing powers, however, it is preferred that the mask array include a plurality of each mask type as indicated by the additional masks with primed and double primed reference numerals. In addition, each mask of the array may be vertically positionable by means of screw clamps 284 moveable in vertical slots 286.

Figure 20A:
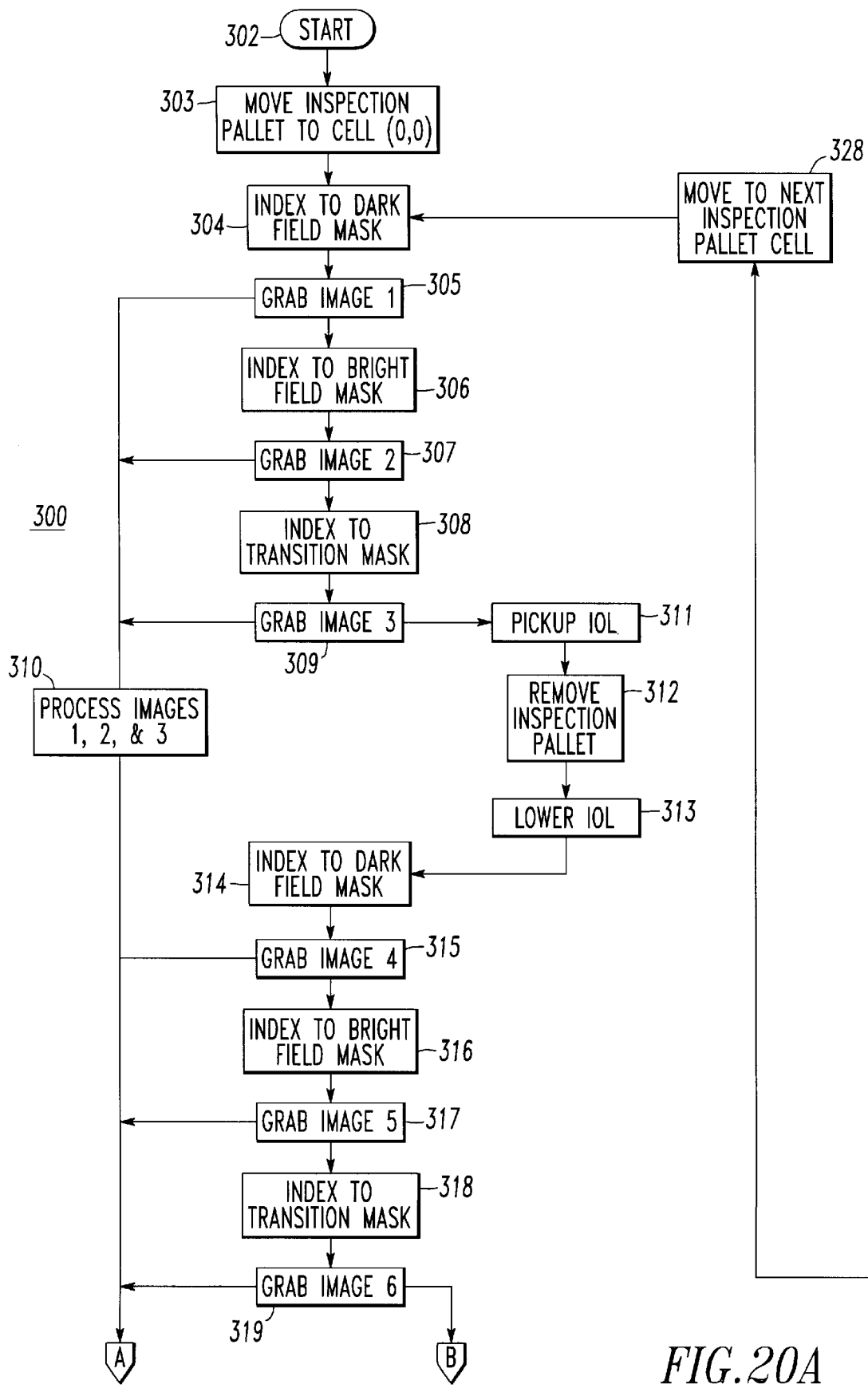
FIG. 20 is a flow chart illustrating the operation of the apparatus of FIGS. 16 and 18.
Figure 20B:
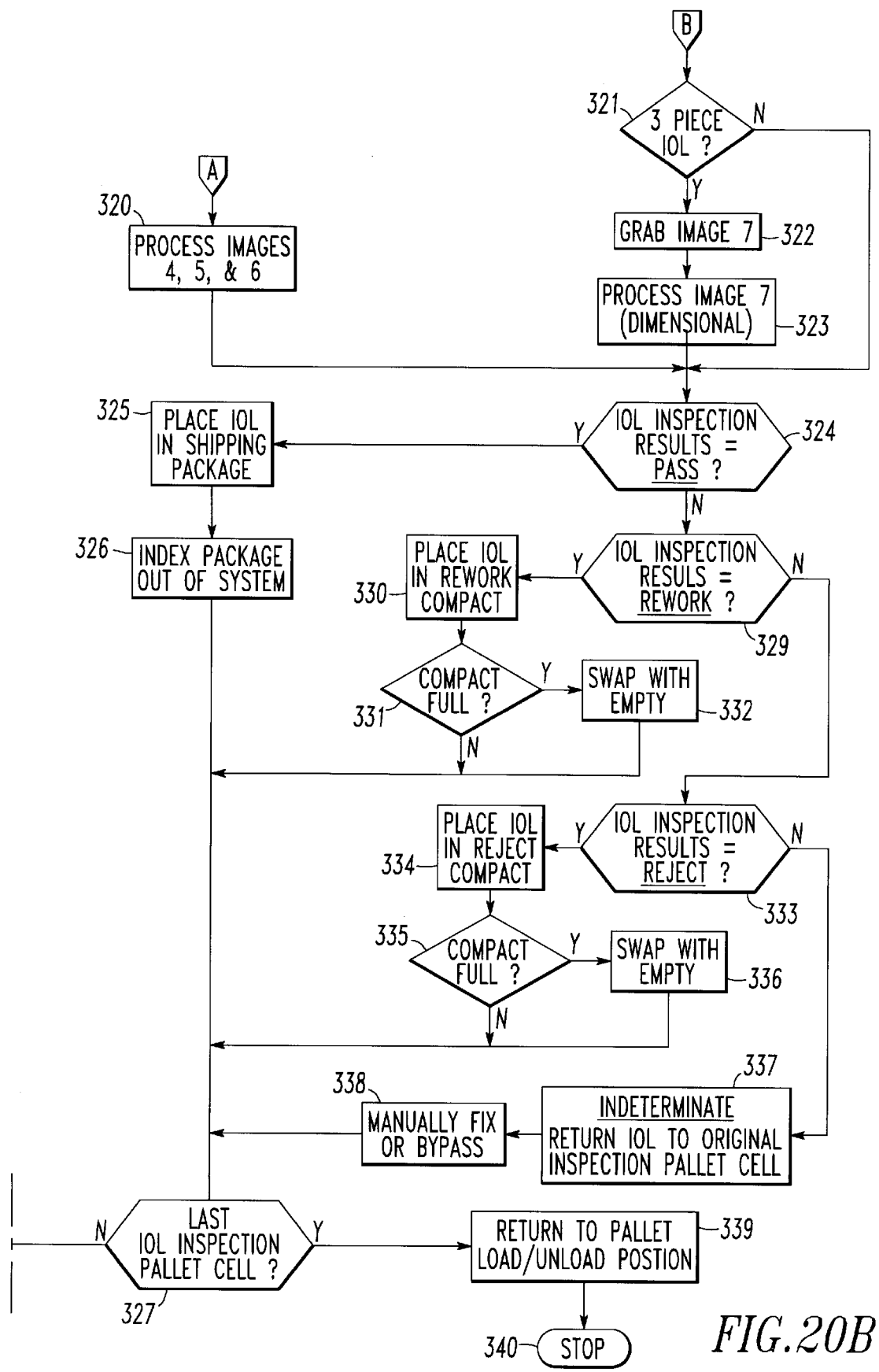
Figure 21A:
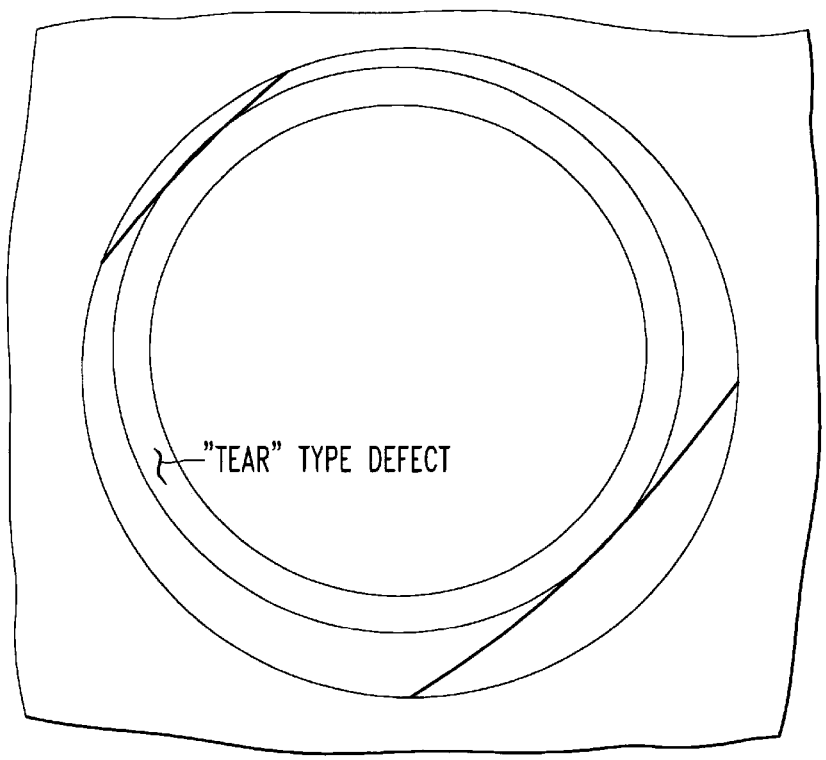
FIGS. 21A to 23D are displays of various IOLs showing different types of defects.
Figure 21B:
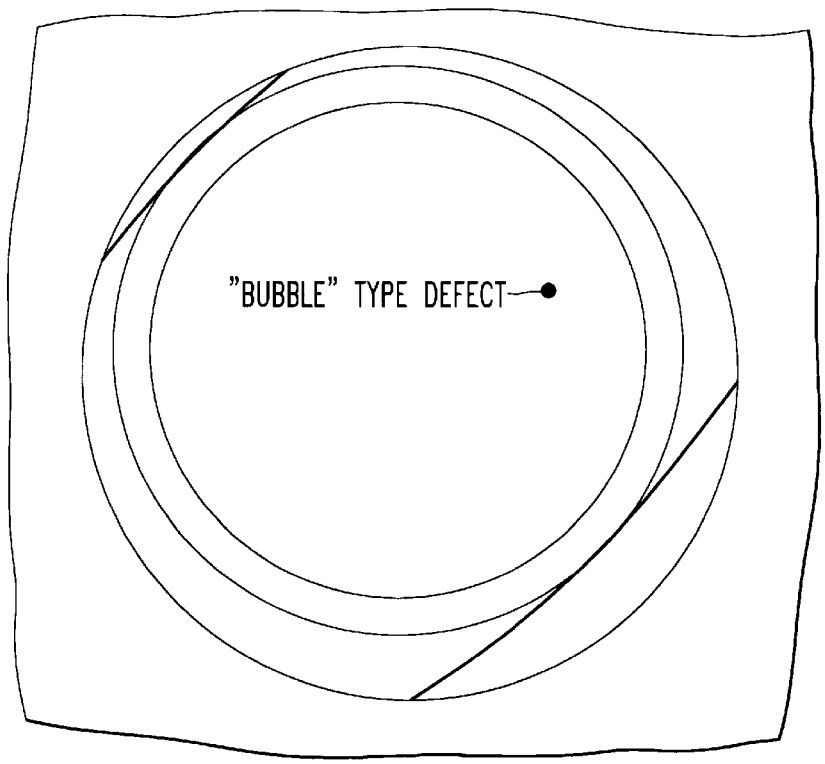
Figure 21C:
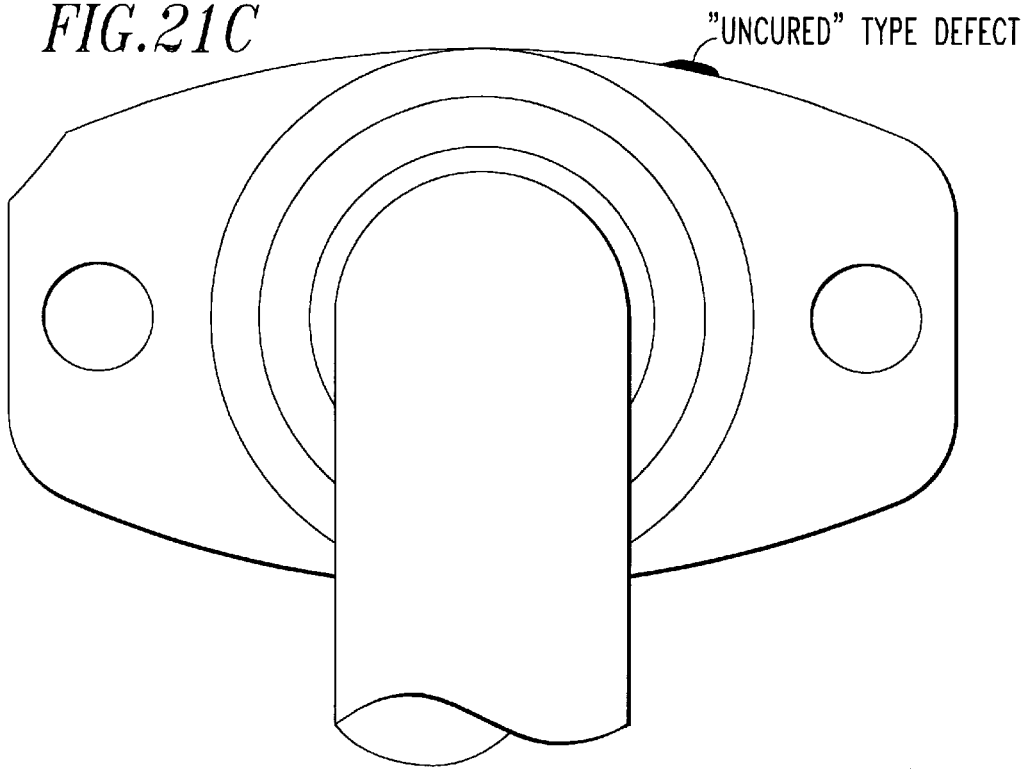
Figure 21D:
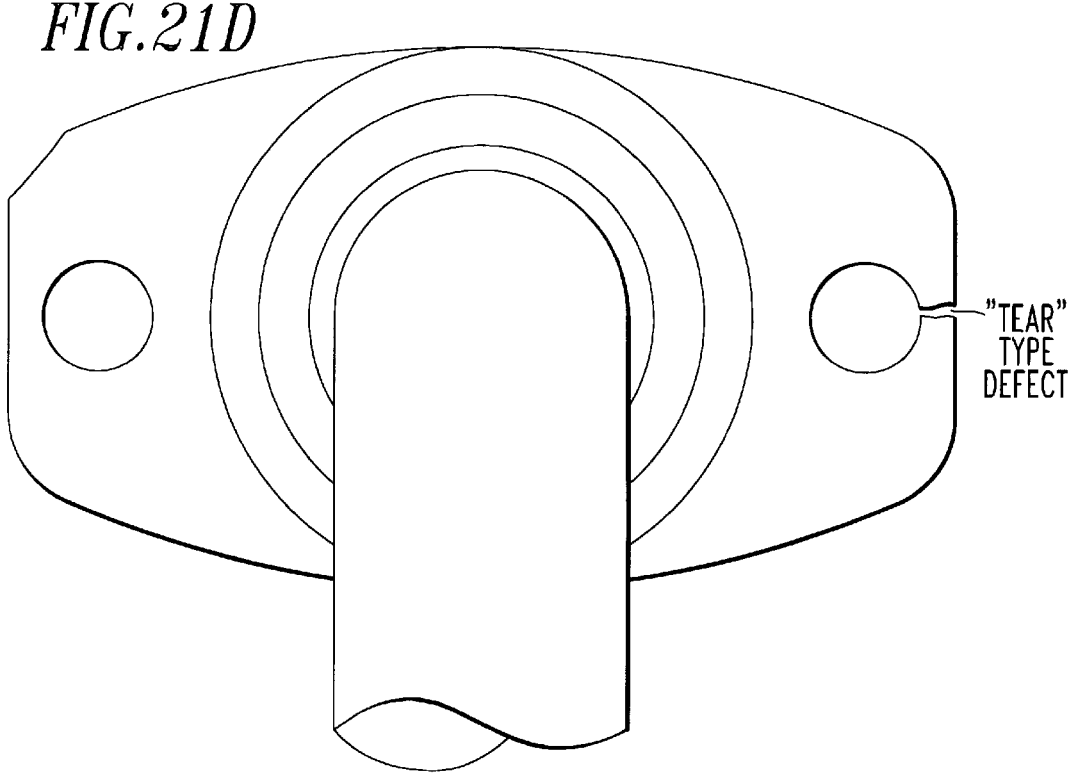
Figure 22A:
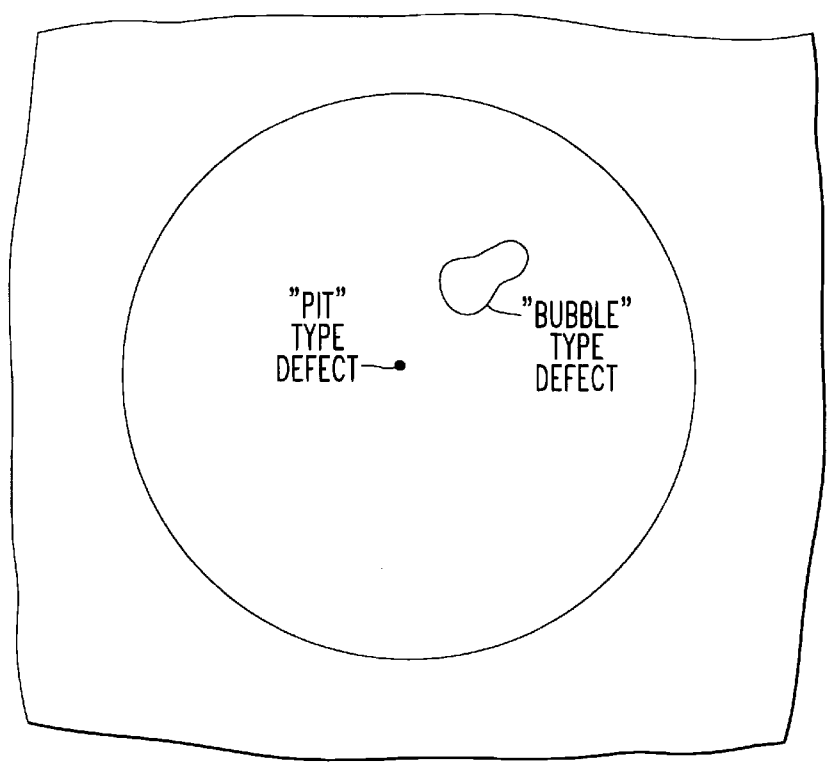
Figure 22B:
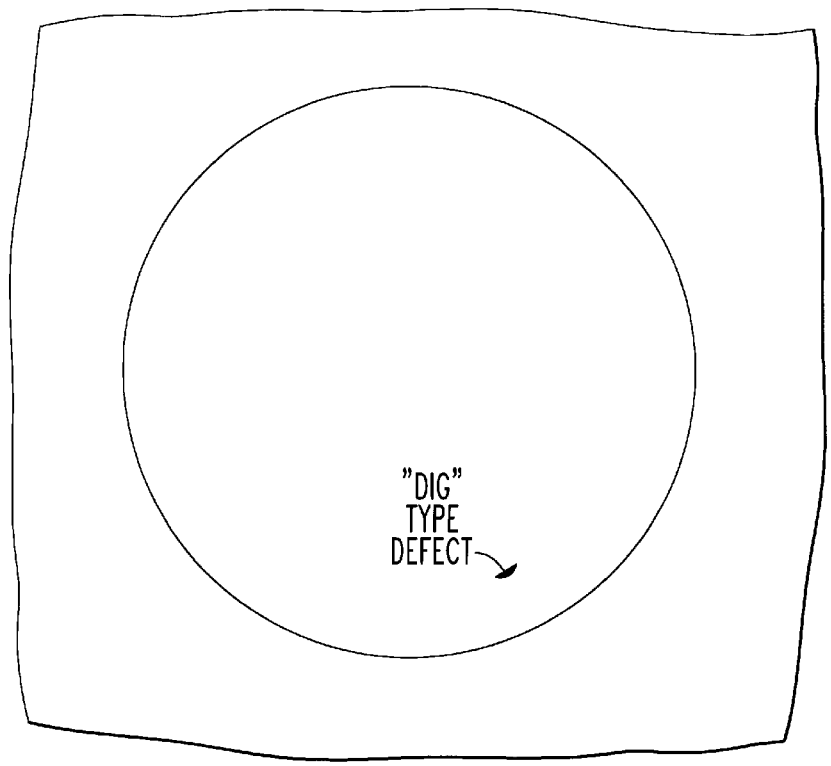
Figure 22C:
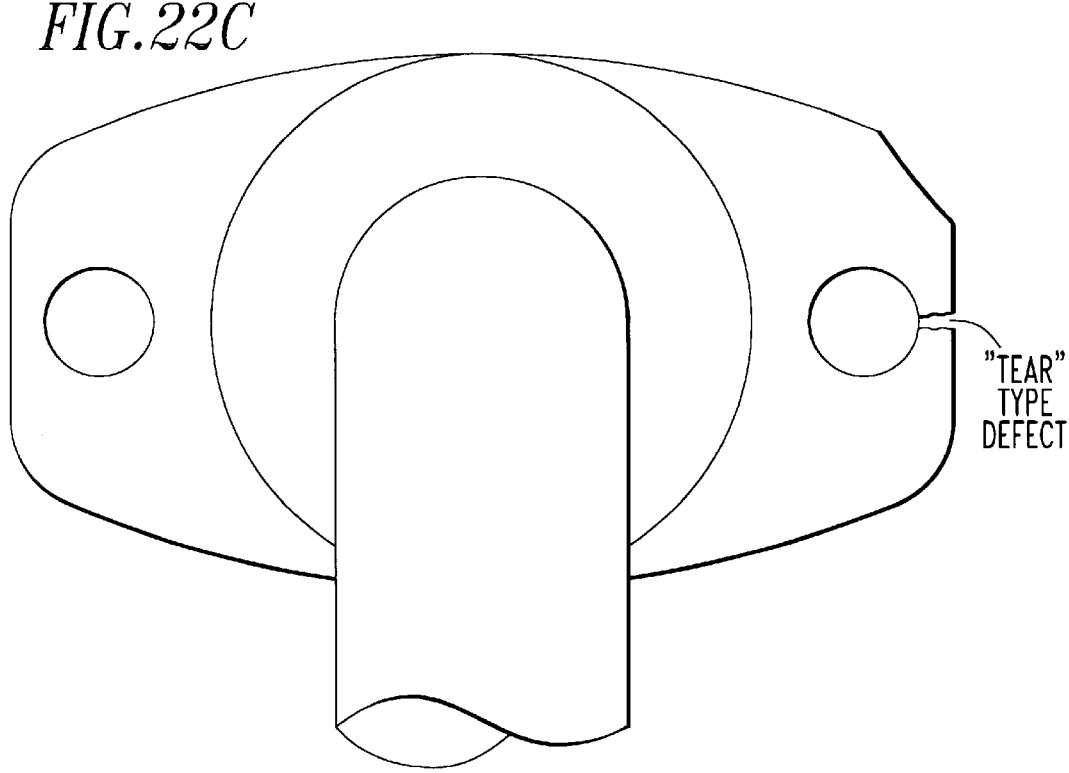
Figure 22D:
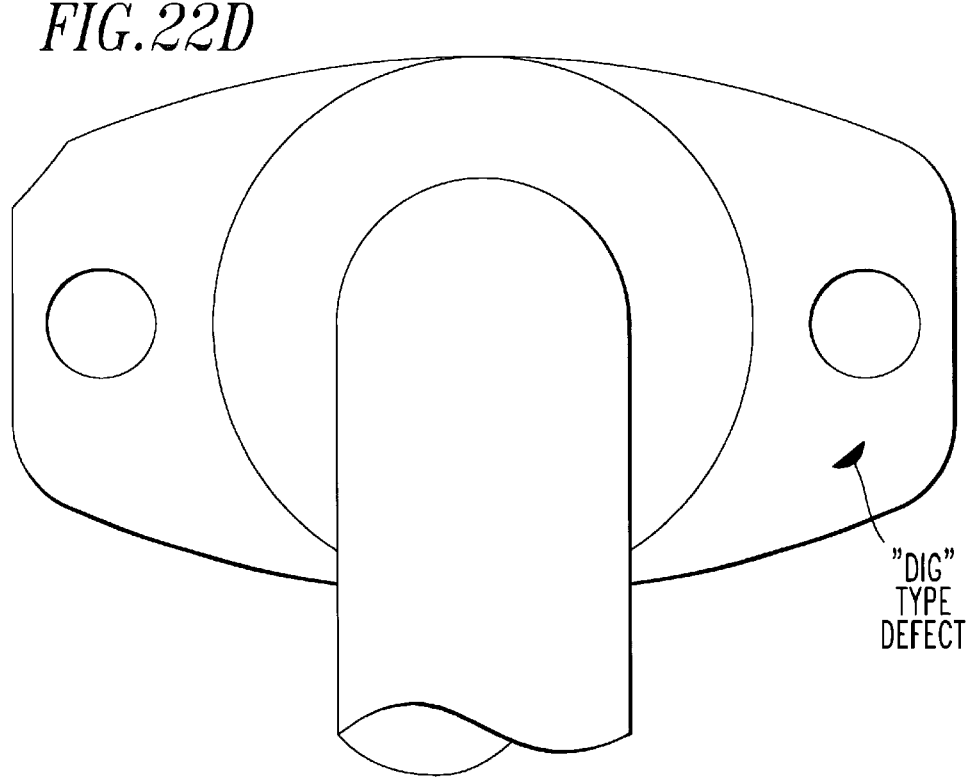
Figure 23A:
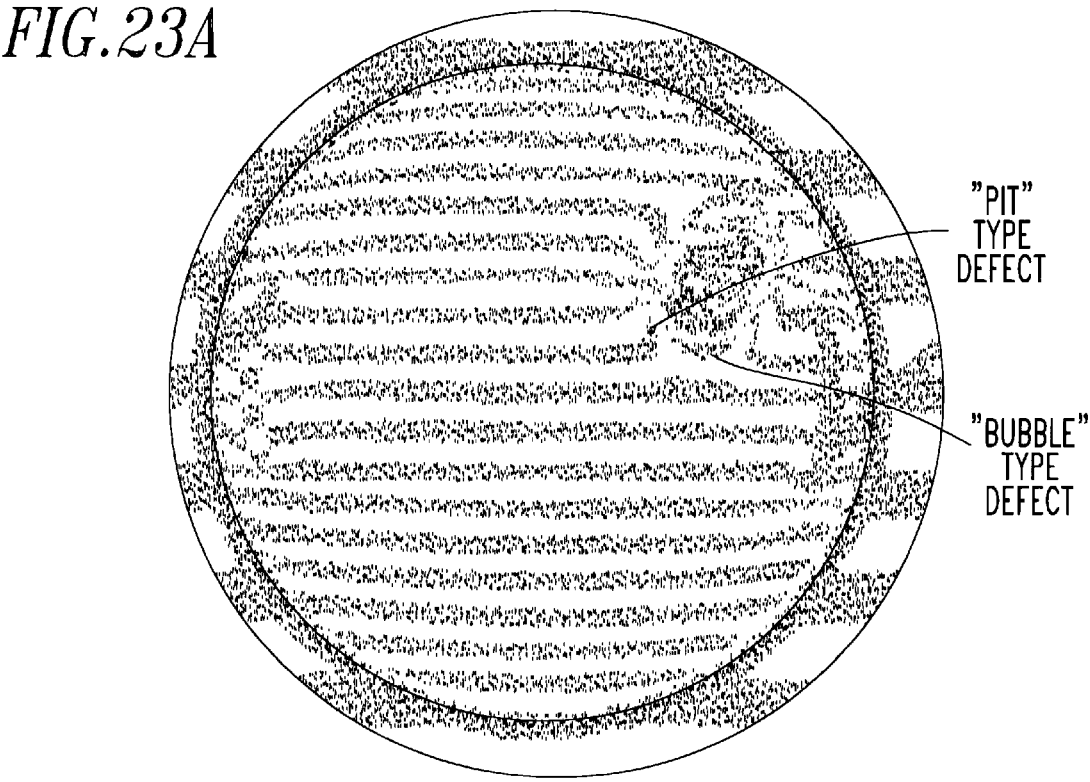
Figure 23B:
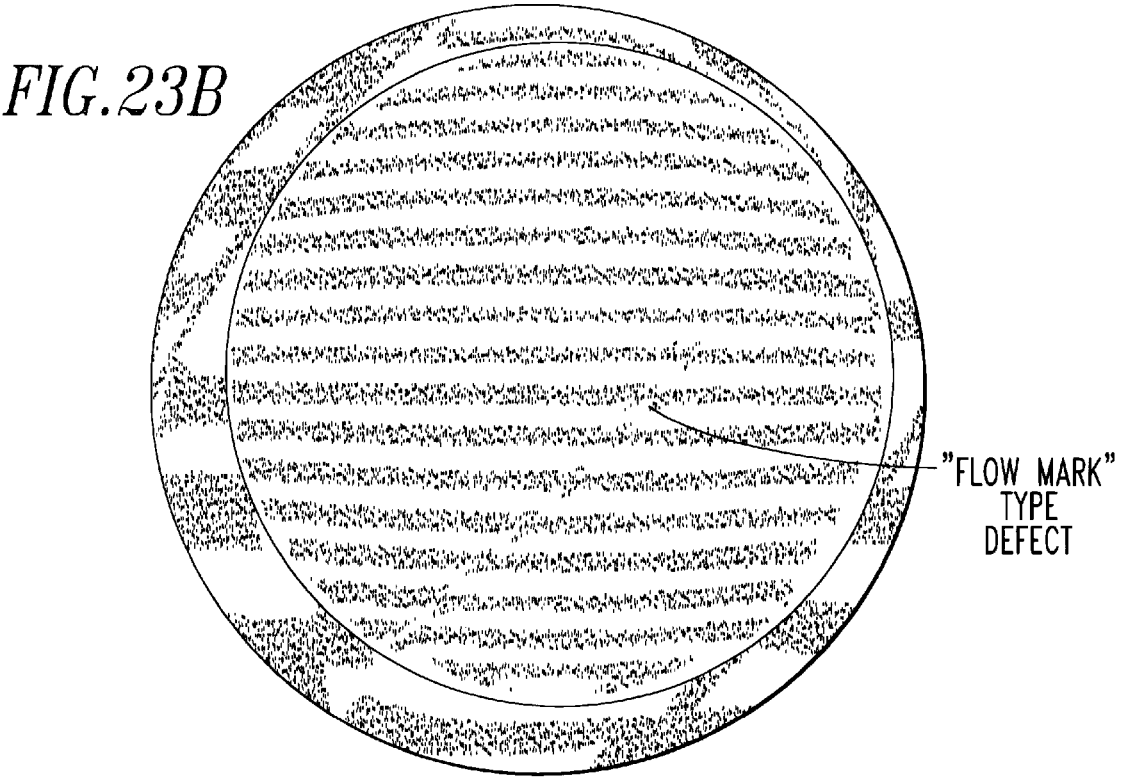
Figure 23C:
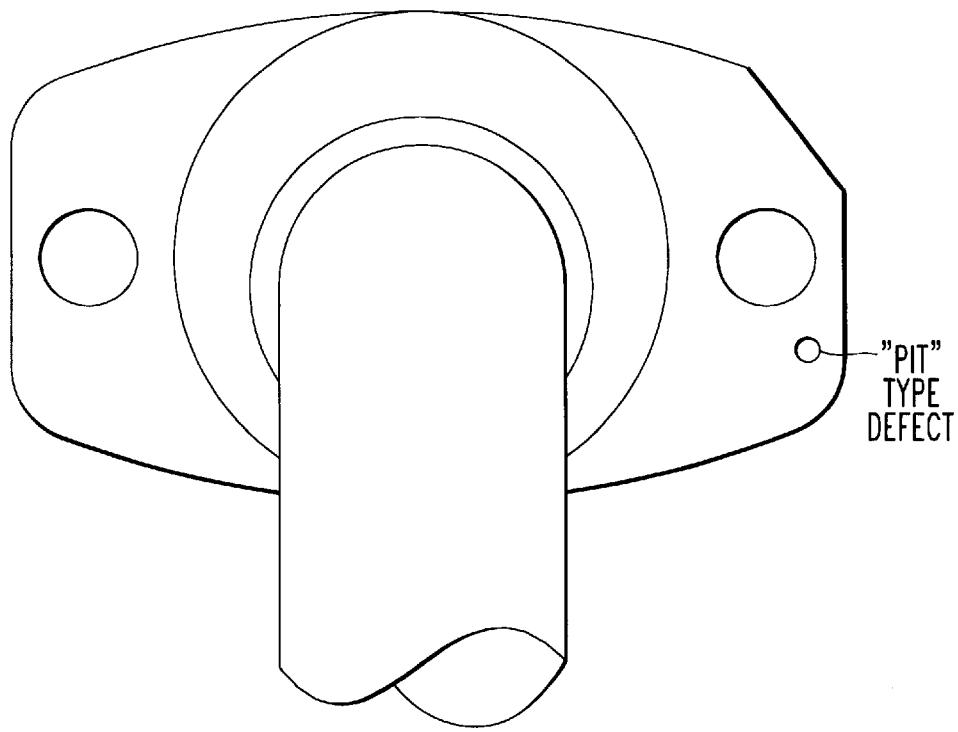
Figure 23D:
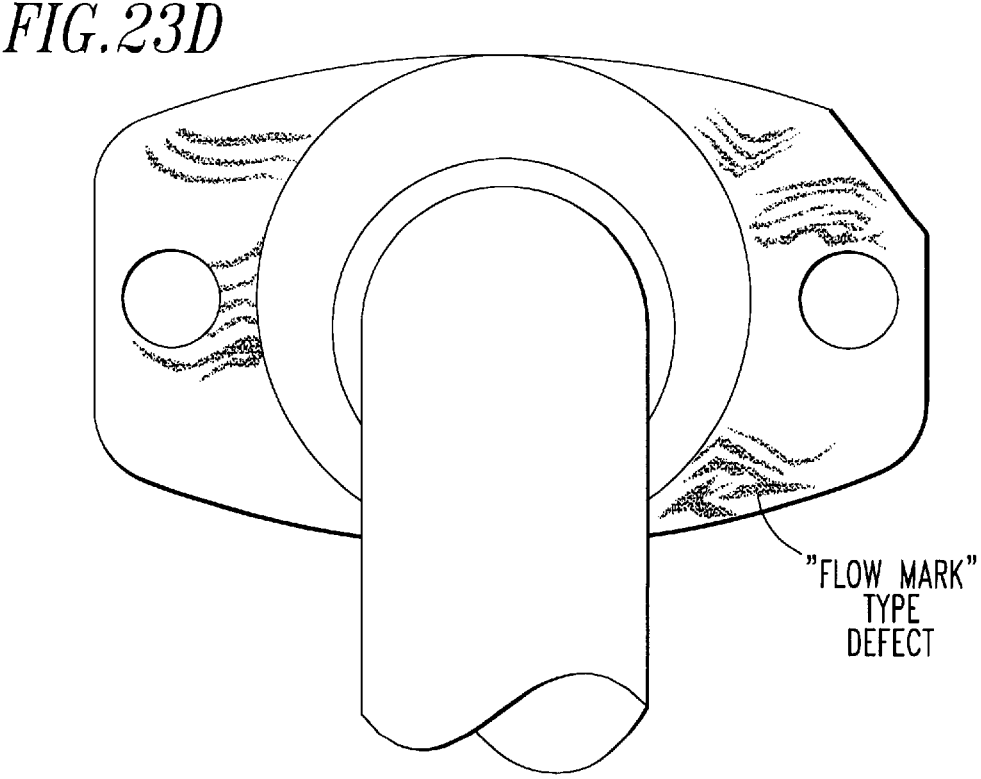

FIG. 20 illustrates a flow chart 300 of a process for inspecting a lens such as an IOL, with the equipment of FIG. 18. After the process is started, step 302, the pallet, that is, the carrier 246 is indexed to present a first IOL for imaging and testing, as indicated by step 303. At step 304 the mask array 248 is indexed to present a first mask, a dark field mask, in the optical path and a first image is obtained at step 305.

In steps 306 and 307 the mask array is again indexed to present a bright field mask and a second image is obtained. The process is repeated a third time in steps 308 and 309 to obtain a third image, utilizing the transition mask.

The three images, now stored in the signal processor 260 are examined for defects at step 310. In addition, the vacuum pick-up device removes the IOL from the pallet, which itself is removed from the optical path and the IOL replaced for further inspection, as depicted by steps 311 to 313. Steps 314 to 319 repeat steps 304 to 309, however without the pallet, to obtain three more images which are processed at step 320.

If the IOL is a three-piece type such as illustrated in FIG. 3 then it must be tested to see if the loops meet certain predetermined standards. This is accomplished in steps 321 to 323. After this processing, or if the IOL is not a three-piece lens, then step 324 determines if the IOL is satisfactory for use. That is, it has no defects or it has certain allowable defects. If the IOL passes the test, it is placed in a shipping package at step 325, and then indexed out of the system at step 326. If there are more IOLs to be tested then the operation moves on to the next IOL, as indicated by steps 327 and 328.

If the IOL did not pass the inspection qualifications at step 324, then step 329 determines if the IOL can be reworked and if so, it is placed into a separate case or compact at step 330. When the compact is full, it is swapped with an empty one at step 332 and the lot is removed for reworking.

If the IOL cannot be reworked after it is inspected, step 333 determines if it should be rejected. If a rejection is indicated, the IOL is placed in a compact which is removed after filling, as indicated in steps 334 to 336.

If the rejection determination at step 333 is negative, then, in steps 337 and 338, it is put back into the pallet for adjustment and further testing. When the last IOL has been examined the pallet is reloaded with a new set of IOLs for testing, as indicated at step 339 and the process stops at step 340 whereby the operator can, if necessary, enter new data for the new lot to be tested.

The camera used to obtain the various images includes a CCD array which provides the signal processor with a plurality of signals indicative of individual pixel values of the image, as is well known. In the processing of the images at steps 310, 320 and 323, the signal processor may examine and store the individual pixel values. In accordance with a variety of different defect recognition programs, the signal processor will compare each pixel value with its immediate neighbor pixel values to see if certain predetermined criteria are met, to determine type, severity and location of defects. By utilizing at least the bright field and dark field masks the images will be able to show a vast variety of different defects. An even greater number of defects can be accommodated if the transition mask is additionally used, as depicted by steps 308 and 318.

In a variety of pattern recognition programs, the signal processing, whereby each pixel is compared with it neighbors may be reduced by providing the program with a already known information. For example, in the present invention this already known information may include the known size of the aperture which holds the IOL, and the known shape of the particular IOL under test. In this manner only the pixels on the edge of, and within the known shape need be processed.

The equipment shown in FIG. 18 has been utilized to examine various IOLs and the following Figs. illustrate various displayed images, showing a variety of defects described herein, such defects being labeled on the respective Figs.

Figure 24:
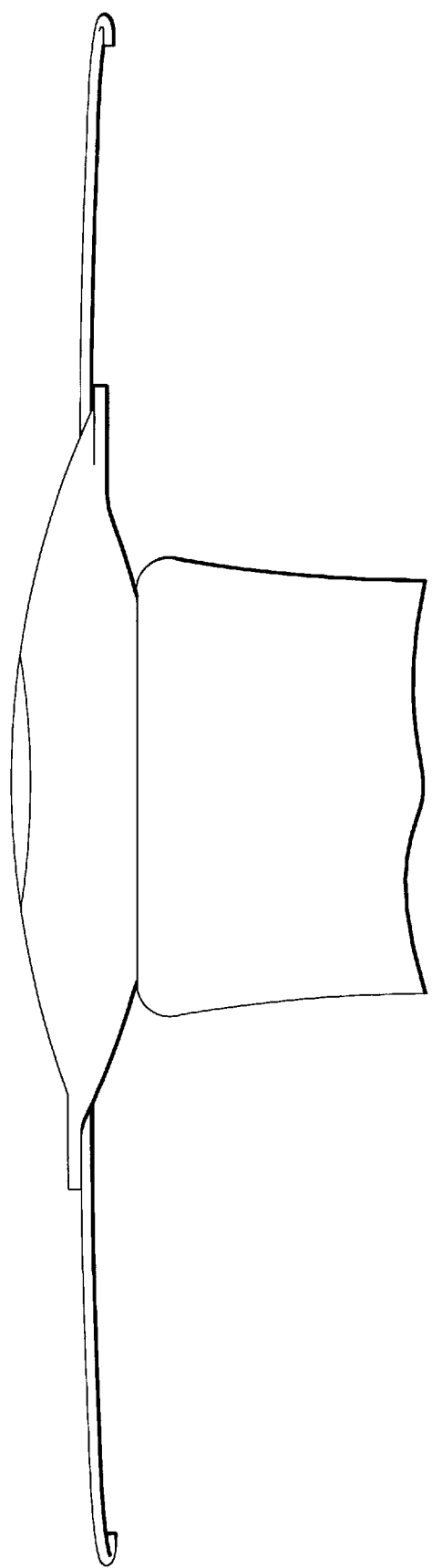
FIG. 24 is a display of an IOL as depicted in FIG. 17A.

FIGS. 21A to 21D are images obtained using a bright field mask, FIGS. 22A to 22D show some results using a dark field mask and FIGS. 23A to 23D are displays using the transition mask. FIG. 24 is included, and although it does not show any defects it is included to show a typical image obtained with the second camera for determining loop angle with respect to a mid plane.

Although the present invention has been described with a certain degree of particularity, it is to be understood that various substitutions and modifications may be made without departing from the spirit and scope of the invention as defined in the appended claims.

What is claimed is:

1. Apparatus for determining defects in an optically transmissive object to be tested, said object having a lens portion, comprising:
   (A) at least one camera for obtaining images of said object, said camera having an optical axis;
   (B) at least one light source positioned along said axis for directing light at said camera;
   (C) an object inspection location disposed between said camera and said light source for receiving said object;
   (D) first and second masks positionable between said light source and said inspection location, with one of said masks being constructed and arranged to pass light from said light source through said object, the other of said masks having a light blocking portion and a light transmitting portion surrounding said light blocking portion, said light blocking portion being of a size and shape that, in the absence of defects, a dark background is totally formed in the image of said object being inspected, while in the presence of a defect, a corresponding bright region is created within said dark background;
   (E) said camera being operable to obtain a first image of said object, with one of said masks in position between said light source and said inspection location, and a second image of said object with the other of said masks in position between said light source and said inspection location; and
   (F) means for processing said first and second images of said object to obtain indications of predetermined defects.

2. Apparatus according to claim 1 wherein:
   (A) said object a bi-convex lens.

3. Apparatus according to claim 2 wherein:
   (A) said lens is an intraocular lens.

4. Apparatus according to claim 3 wherein:
   (A) said intraocular lens includes on optical lens portion and a planar portion.

5. Apparatus according to claim 1 wherein:
   (A) said light is diffused light.

6. Apparatus according to claim 5 wherein:
   (A) said masks are operable to diffuse the light from said light source.

7. Apparatus according to claim 1 which additionally includes:
   (A) a third mask positionable between said light source and said inspection location;
   (B) said third mask having a series of alternating light blocking and light transmitting regions.

8. Apparatus according to claim 7 wherein:
   (A) said third mask has a striped pattern thereon.

9. Apparatus according to claim 3 wherein:
   (A) said intraocular lens includes first and second attachment loops; and which additionally includes:
      (b) means for obtaining a side view image of said intraocular lens including said first and second loops.

10. Apparatus according to claim 9 wherein:
    (A) said means for processing is operable to process said side view image for determining if each said attachment loop deviates from a predetermined position by an amount greater than a predetermined threshold.

11. Apparatus according to claim 1 wherein said apparatus includes:
    (A) a single camera for obtaining images of said object;
    (B) a single light source; and
    (C) means for positioning individual objects to be tested between said single camera and said single light source.

12. Apparatus according to claim 11 wherein:
    (A) said light source is a strobe light.

13. Apparatus for inspecting lenses, comprising:
    (A) a camera for obtaining electronic images;
    (B) a light source positioned to direct light toward said camera;
    (C) a carrier for holding a plurality of said lenses to be inspected;
    (D) a carrier drive for positioning individual ones of said plurality of lenses in the light path between said light source and said camera;
    (E) a mask assembly including at least two masks, one of said masks allowing transmission of said light from said source through a positioned lens and the other for selectively blocking a portion of said light;
    (F) a mask assembly drive for positioning said masks, one at a time, between said light source and said positioned lens;
    (G) signal processing and control means being operable to control said carrier drive, said mask assembly drive and said camera for obtaining at least two electronic images of each said positioned lens; and
    (H) said signal processing and control means being further operable to analyze said obtained images to provide an indication of predetermined defects in a said lens.

14. Apparatus according to claim 13 wherein:
    (A) said mask assembly additionally includes a third mask;
    (B) said third mask having a series of alternating light blocking and light transmitting regions.

15. Apparatus according to claim 14 wherein:
    (A) said third mask has a striped pattern thereon.

16. Apparatus according to claim 15 wherein:
    (A) said mask assembly includes a plurality of each of kind of said masks.

17. Apparatus according to claim 13 which includes:
    (A) a pick-up device for removing a lens from said carrier.

18. Apparatus according to claim 13 wherein:
    (A) said lens is an intraocular lens.

19. Apparatus according to claim 18 wherein:
    (A) said intraocular lens includes first and second attachment loops; and which additionally includes:

(b) means for obtaining a side view image of said intraocular lens including said first and second loops.

20. Apparatus according to claim 19 wherein:

(A) said signal processing and control means is operable to process said side view image for determining if each said attachment loop deviates from a predetermined position by an amount greater than a predetermined threshold.

21. A method for inspecting optically transmissive objects having a lens portion, comprising the steps of:

(A) placing said object at an inspection location between a light source and an electronic camera which obtains images of said object;

(B) obtaining a first image of said object with one of a bright field or dark field mask in position between said light source and said object;

(C) obtaining a second image of said object with the other of said bright field or dark field mask in position between said light source and said object; and (D) analyzing said obtained images to determine the presence of predetermined defects.

22. A method according to claim 21 wherein:

(A) said light source provides diffused light.

23. A method according to claim 21 wherein the method includes:

(A) obtaining a third image of said object with a third mask in position between said light source and said object, said third mask having a series of alternating light blocking and light transmitting regions.

24. A method according to claim 23 wherein:

(A) said light source provides diffused light.

25. A method according to claim 21 wherein:

(A) said object is an intraocular lens.

26. A method according to claim 21 wherein the method includes:

(A) separating said objects after said analyzing step into a plurality of categories including a pass category, a reject category and a rework category.

27. Apparatus according to claim 21 wherein:

(A) said light source is a strobe light.

* * * * *